US008483452B2

(12) United States Patent
Ueda et al.

(10) Patent No.: US 8,483,452 B2
(45) Date of Patent: Jul. 9, 2013

(54) IMAGE PROCESSING APPARATUS, IMAGE PROCESSING METHOD, AND PROGRAM

(75) Inventors: Atsushi Ueda, Tokyo (JP); Jun Minakuti, Tokyo (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 13/024,390

(22) Filed: Feb. 10, 2011

(65) Prior Publication Data
US 2011/0222793 A1  Sep. 15, 2011

(30) Foreign Application Priority Data

Mar. 9, 2010 (JP) ................................. 2010-051861

(51) Int. Cl.
*G06K 9/00* (2006.01)
(52) U.S. Cl.
USPC ........... 382/118; 382/103; 382/294; 382/154; 348/208.12; 348/208.14; 348/208.16
(58) Field of Classification Search
USPC ............. 382/118, 294, 154, 103; 348/208.12, 348/208.14, 208.16
See application file for complete search history.

(56) References Cited

U.S. PATENT DOCUMENTS

| 5,309,243 | A  | * | 5/1994  | Tsai            | 348/221.1 |
| 5,828,793 | A  | * | 10/1998 | Mann            | 382/284   |
| 6,418,245 | B1 | * | 7/2002  | Udagawa         | 382/312   |
| 7,239,805 | B2 | * | 7/2007  | Uyttendaele et al. | 396/222 |
| 7,546,026 | B2 | * | 6/2009  | Pertsel et al.  | 396/52    |
| 7,616,233 | B2 | * | 11/2009 | Steinberg et al. | 348/222.1 |
| 2002/0012071 | A1 | * | 1/2002 | Sun             | 348/578   |

FOREIGN PATENT DOCUMENTS

| JP | 2002-101347 |   | 4/2002 |
| JP | 2002101347  | * | 4/2002 |

OTHER PUBLICATIONS

Seamless Image stitching—Exposure, Eden et al., IEEE 0-7695-2597-0, 2006, pp. 1-8.*

* cited by examiner

*Primary Examiner* — Jayesh A Patel
(74) *Attorney, Agent, or Firm* — Oblon, Spivak, McClelland, Maier & Neustadt, L.L.P.

(57) ABSTRACT

An image processing apparatus includes: a conversion section converting a moving object image being an image in a region corresponding to a moving object included in a reference image and other images constituting images generated under different exposure conditions. The image processing apparatus also includes a substitution section substituting the generated exposure level converted moving object image with a region corresponding to an exposure level converted moving object image of each of the other images corresponding to an exposure level as a reference exposure level at the time of generating the exposure level converted moving object image to generate a substitute image for each of the other images. A combination section combines the substitute image and the reference image to generate a combined image.

13 Claims, 15 Drawing Sheets

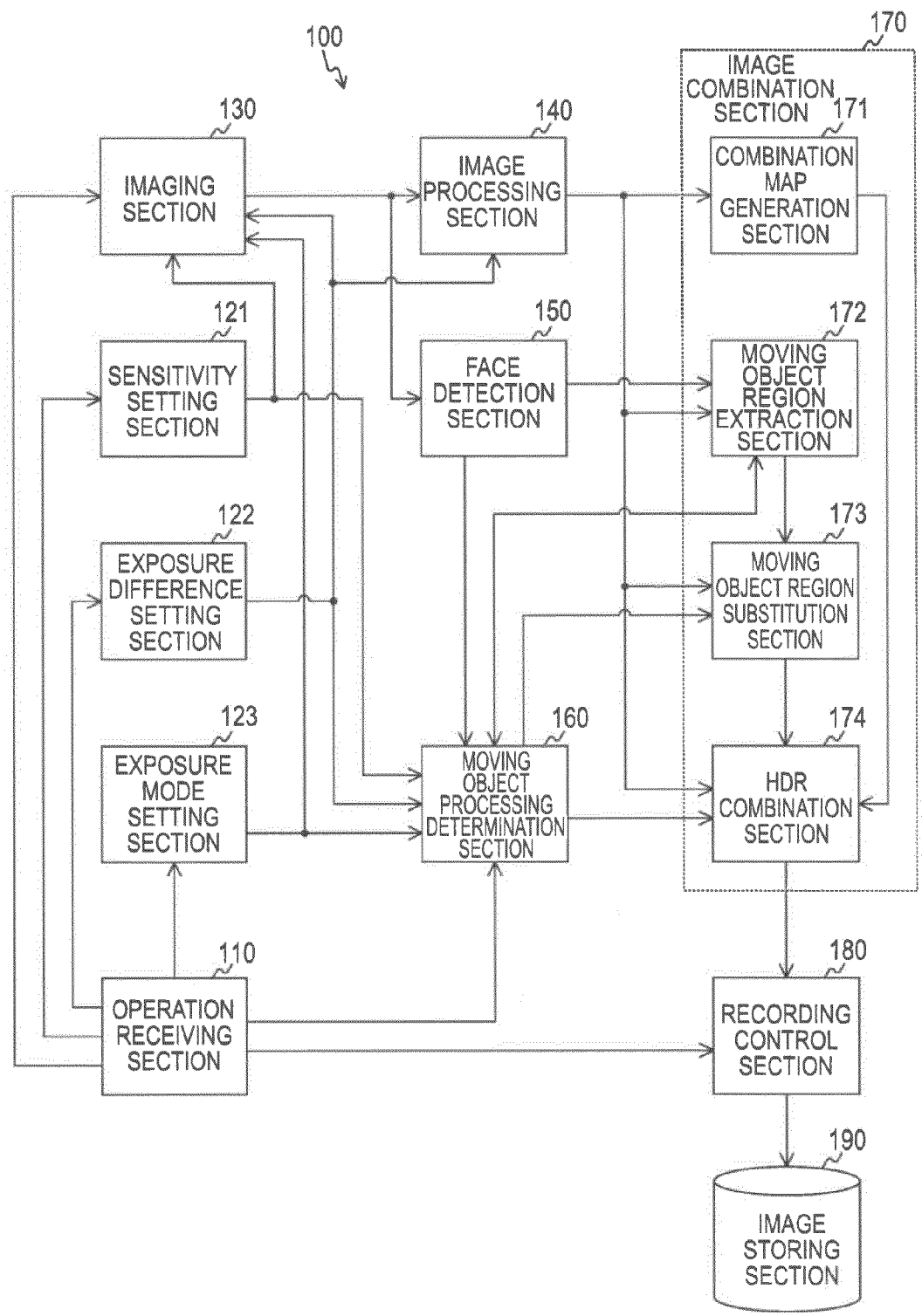

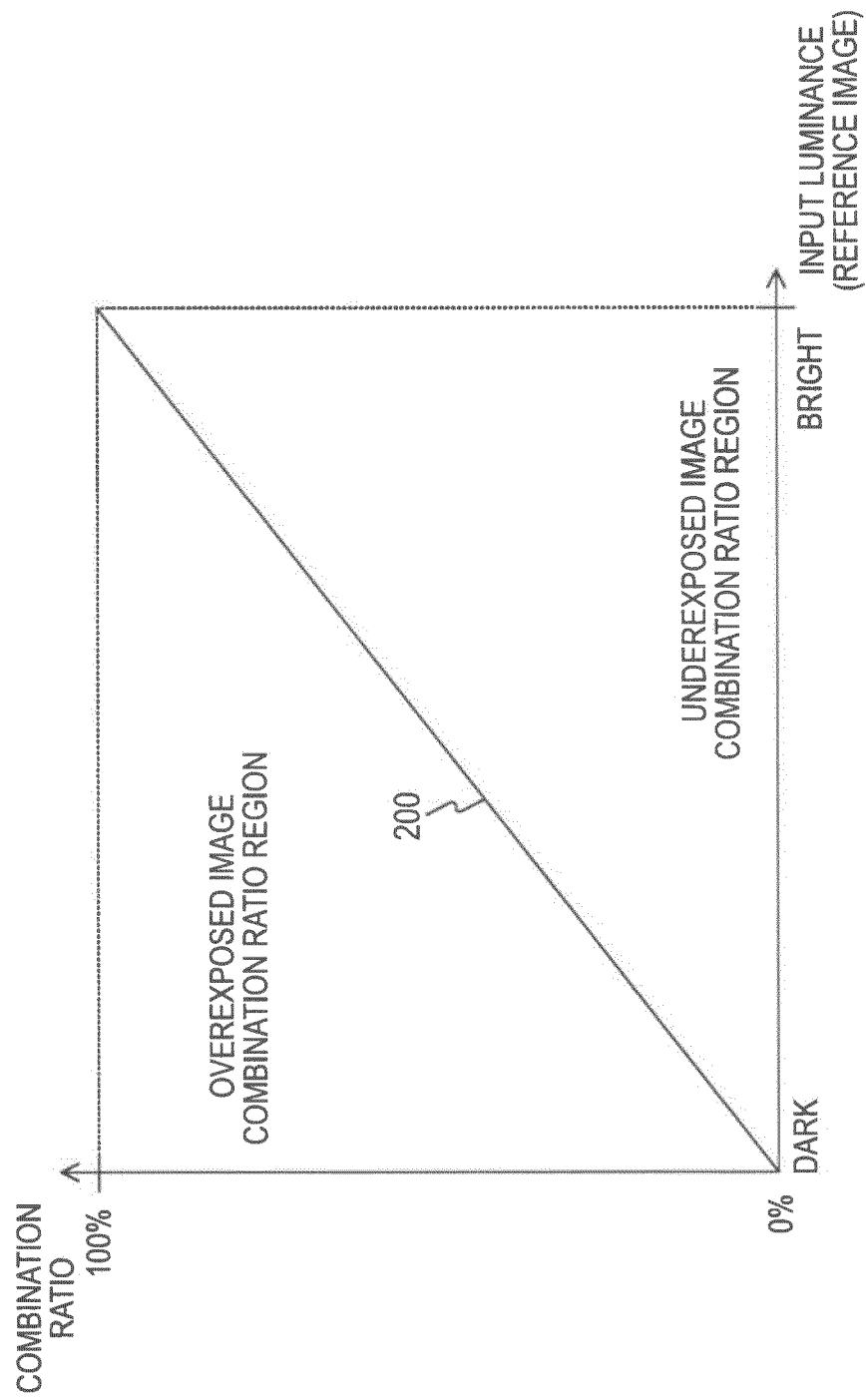

UNDEREXPOSED IMAGE

OVEREXPOSED IMAGE

HDR COMBINED IMAGE

FIG.4A
UNDEREXPOSED IMAGE            OVEREXPOSED IMAGE
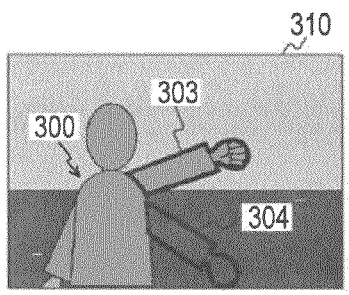 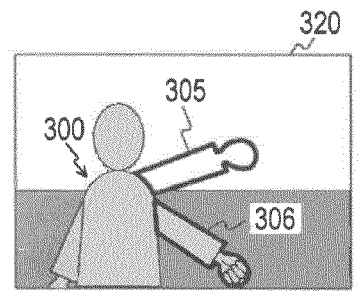
⇩ GAIN-UP
FIG.4B
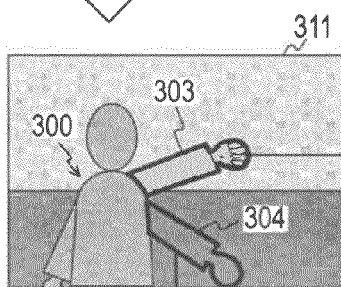
MOVING OBJECT IMAGE IS SUBSTITUTED
FIG.4C
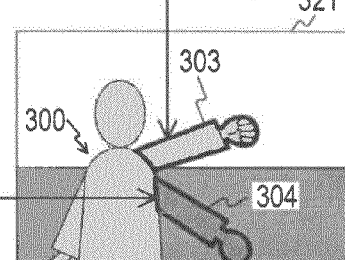
MOVING OBJECT IMAGE IS SUBSTITUTED
FIG.4D
HDR COMBINED IMAGE
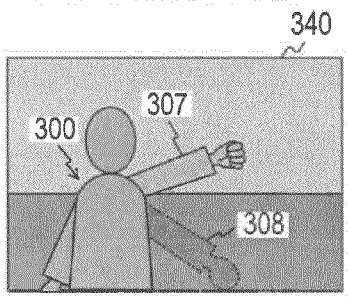

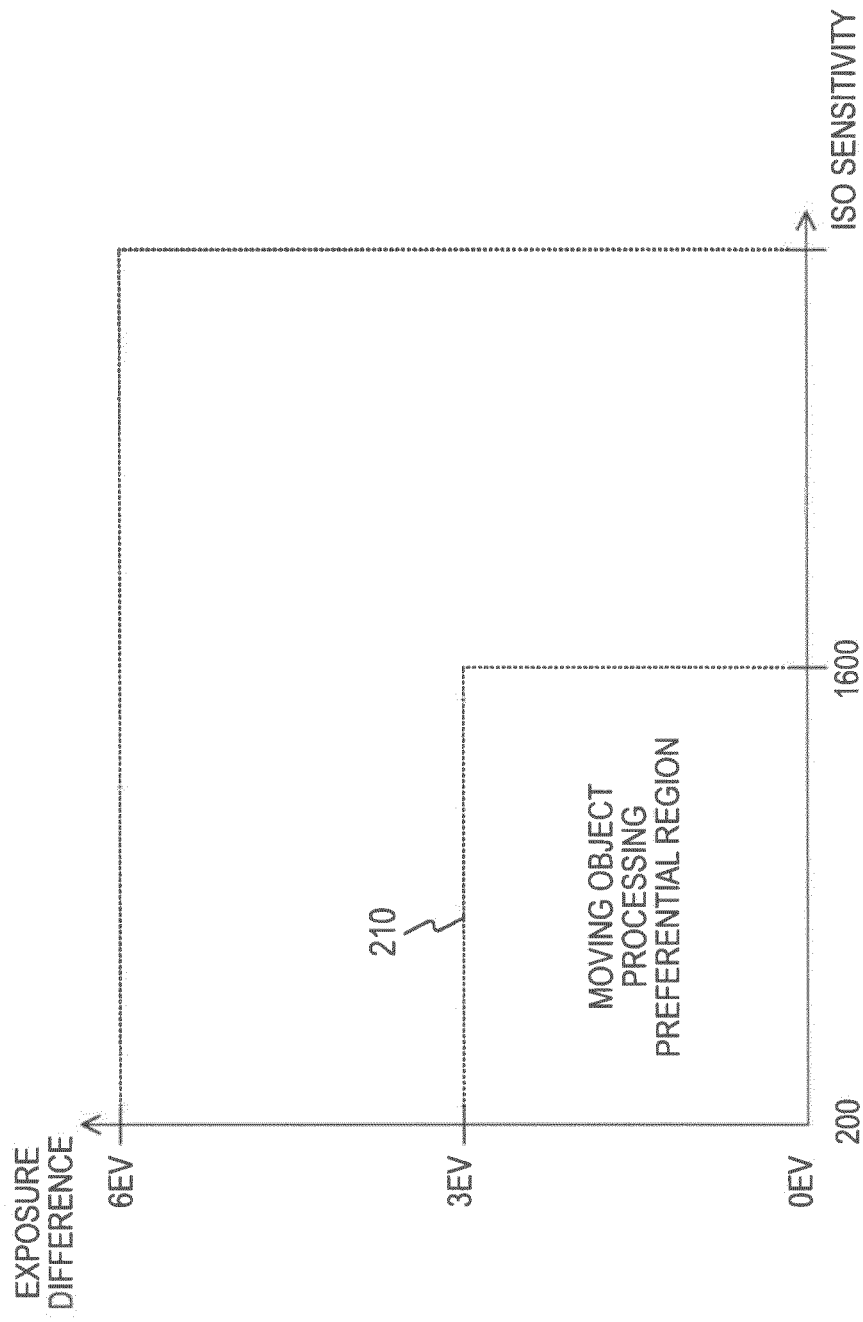

INTERIOR SCENE

BACKLIT SCENE

TWILIGHT SCENE

MOVING OBJECT DETECTION RESULT

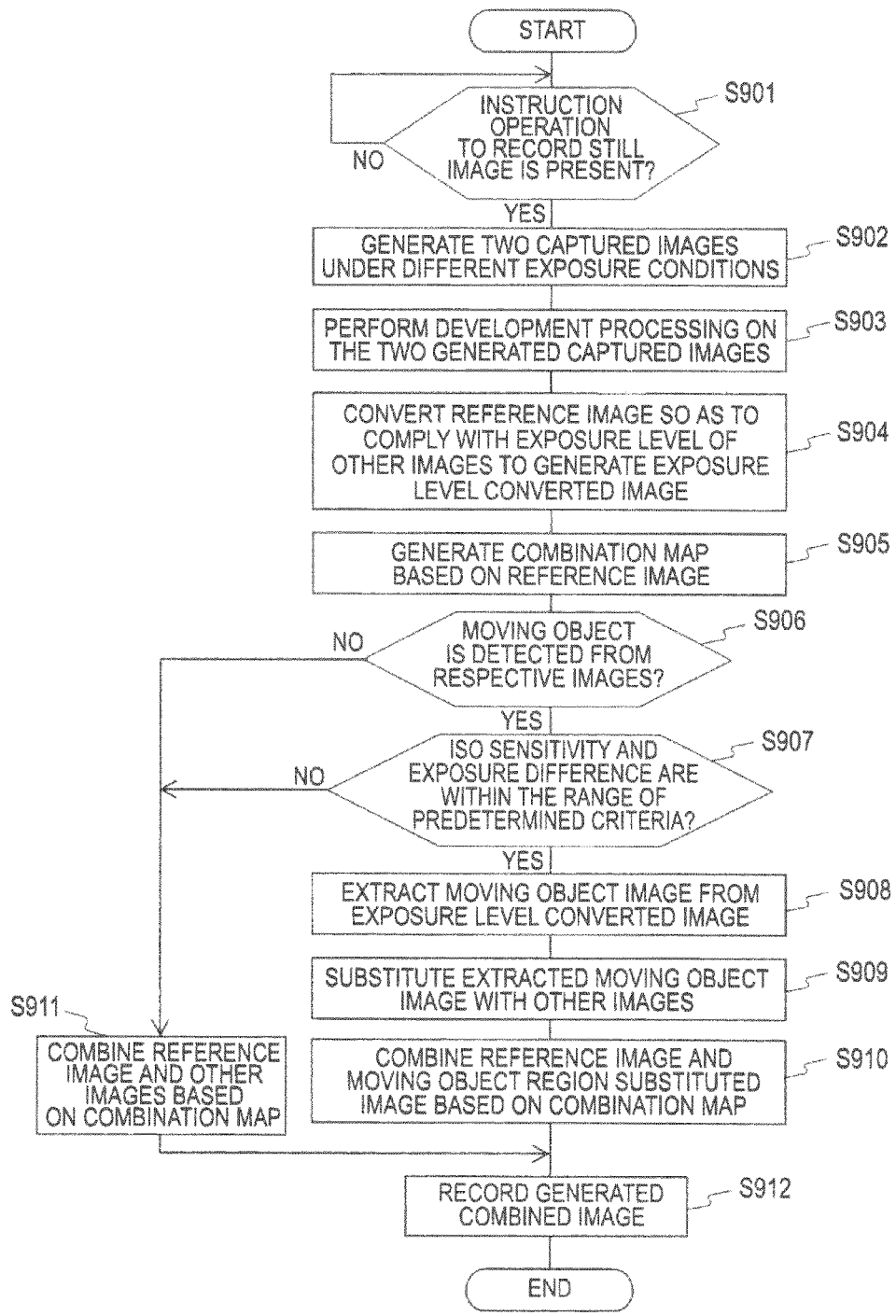

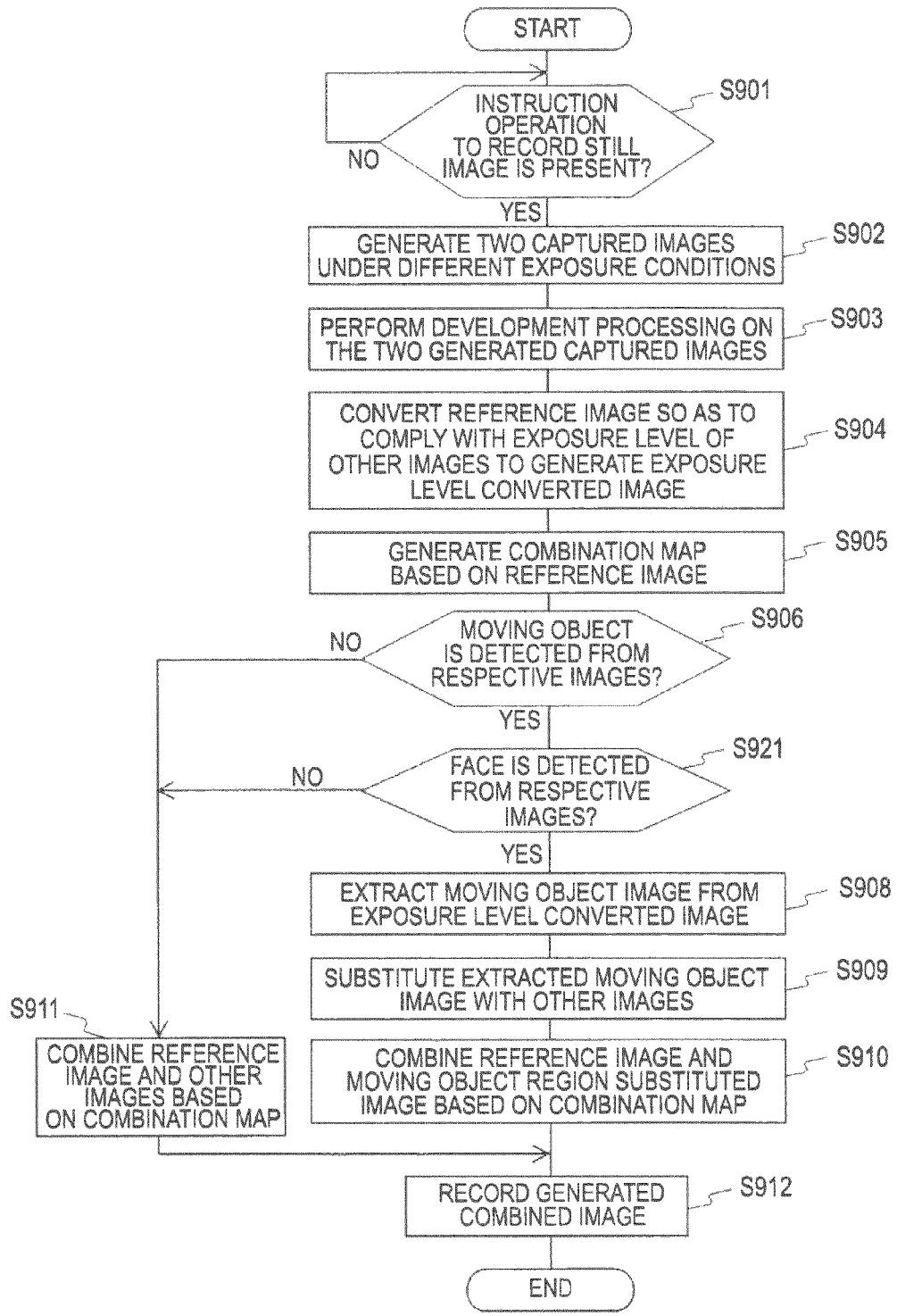

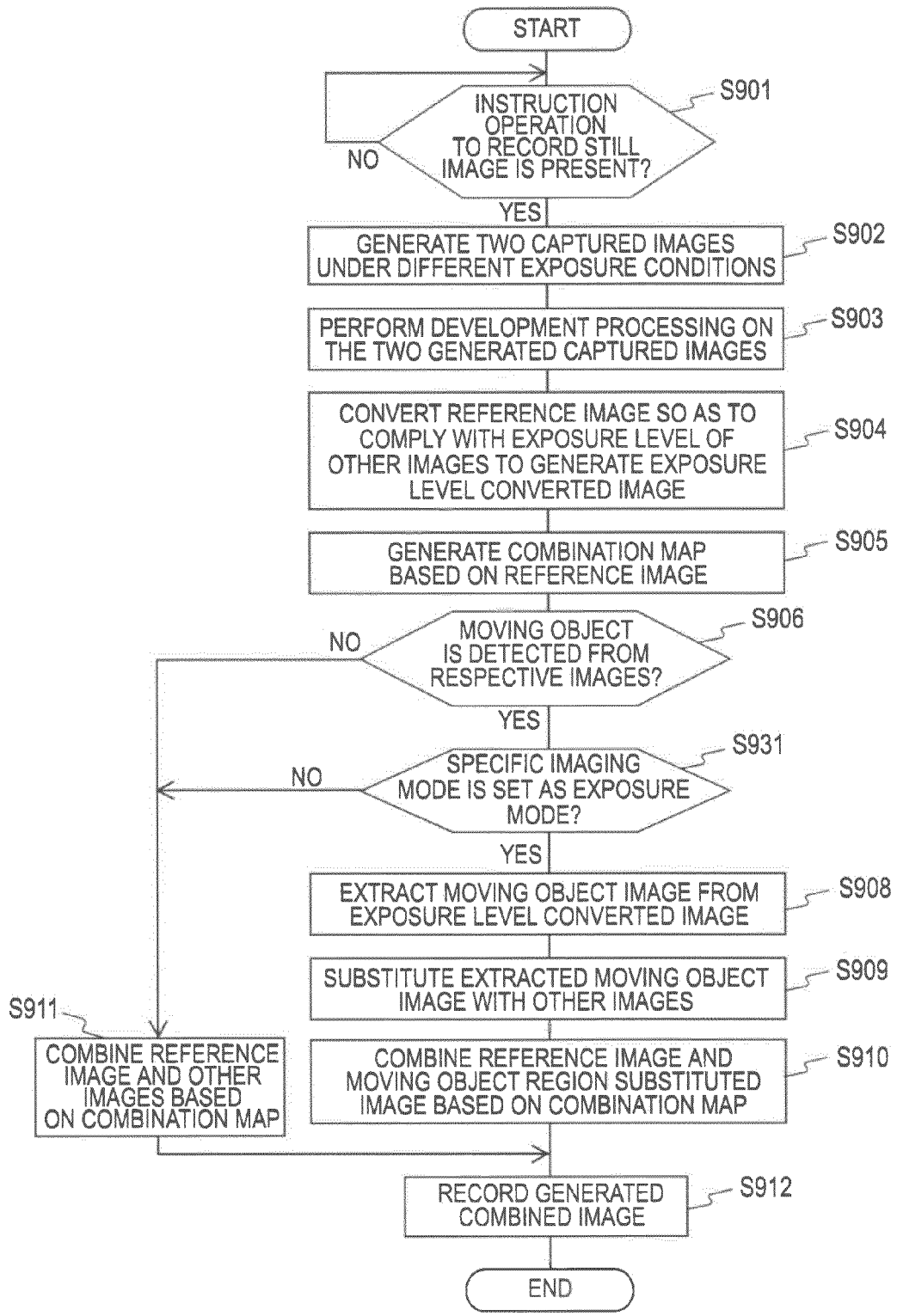

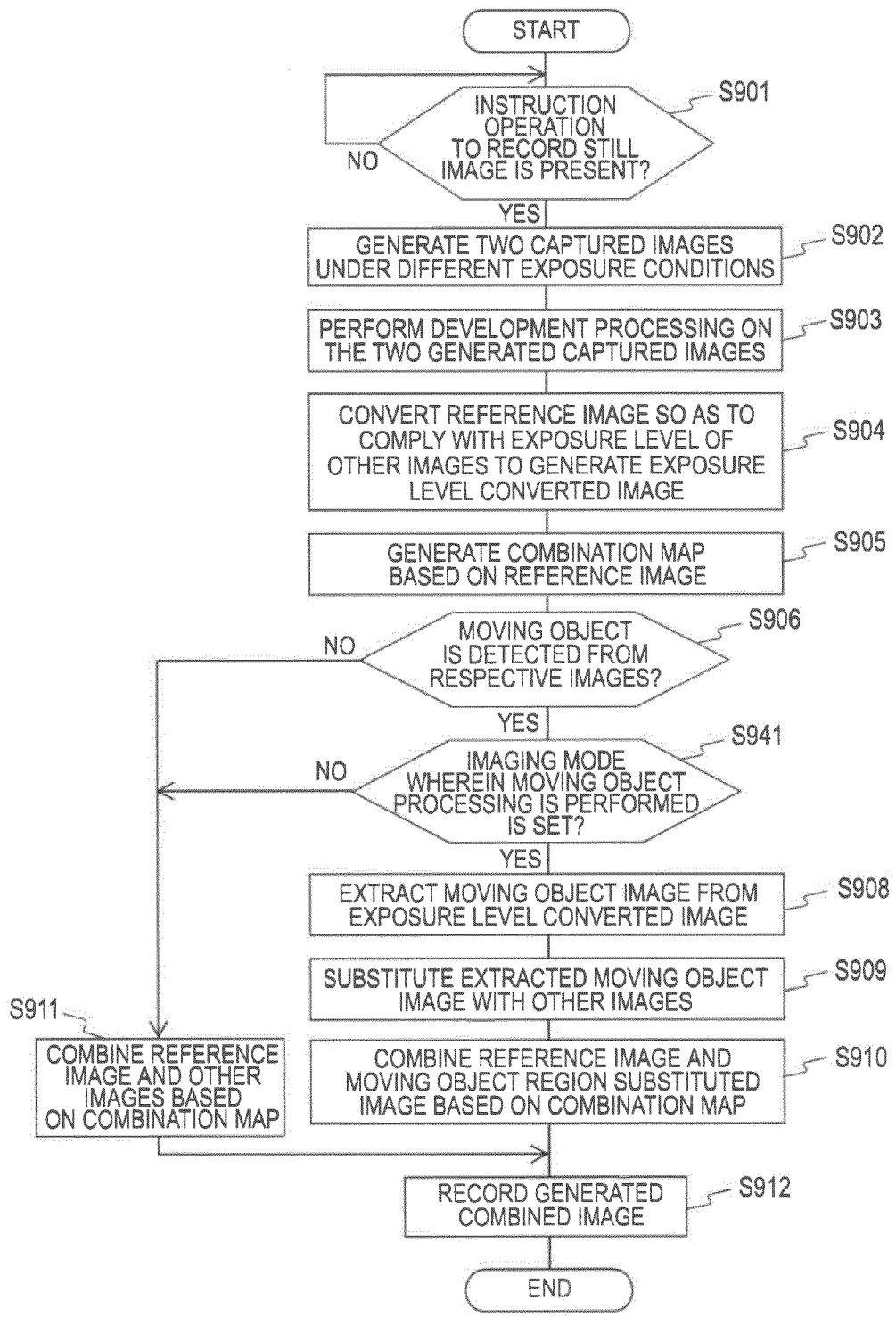

IMAGE PROCESSING APPARATUS, IMAGE PROCESSING METHOD, AND PROGRAM

BACKGROUND OF THE INVENTION

1. Field of the Invention

The present invention relates to an image processing apparatus, and more particularly, to an image processing apparatus and method for performing an image combination process using a plurality of images and a program for allowing a computer to execute the method.

2. Description of the Related Art

In recent years, imaging apparatuses such as digital still cameras or digital video cameras (for example, camcorders) that image a subject such as a person or an animal to generate image data and record the image data as image content have been popularized. Moreover, imaging apparatuses that generate an appropriate captured image by automatically performing appropriate exposure control in accordance with a subject have been proposed.

Here, when an imaging operation is performed with exposure control with respect to a scene (for example, a backlit scene) with a large difference in luminance, it is expected that the imaging device provided in an imaging apparatus has an insufficient dynamic range. When the dynamic range of the imaging device is not sufficient, a whiteout may occur in a saturated bright area of a captured image, or a blackout may occur in a dark area of the captured image.

Therefore, an imaging apparatus that generates a combined image with a wide dynamic range by combining a long exposure image and a short exposure image which are generated by an imaging process with different exposure periods has been proposed. However, when a moving object is included in the combination target images used at the time of generating the combined image, there is a possibility that a combined image including the moving objects before and after the movement is generated and appears unnatural (so-called multiple exposure).

Therefore, an imaging apparatus that calculates a difference between a long exposure image and a short exposure image obtained by multiplying it by an exposure ratio between the long exposure image and the short exposure image and switches the images used for generating a combined image in accordance with whether the difference exceeds a predetermined level is proposed (for example, see FIG. 3 of JP-A-2002-101347). In this imaging apparatus, for example, when the difference exceeds a predetermined level, it is determined that there is an image shift between the short exposure image and the long exposure image, and the combination target images are switched in accordance with the polarity of the difference.

SUMMARY OF THE INVENTION

According to the techniques described above, even when a moving object is included in the combination target images used at the time of generating a combined image, it is possible to prevent the occurrence of an afterimage or a breakpoint of the moving object in the moving object region.

However, in the techniques described above, when the difference between two images in the moving object region exceeds a predetermined level, a long exposure image and a short exposure image obtained by multiplying it by an exposure ratio are switched as the combination target images in accordance with the polarity of the difference. Therefore, it is possible to prevent the occurrence of afterimages or breakpoints of the moving objects before and after the movement. However, the long exposure image and the short exposure image obtained by multiplying it by the exposure ratio coexist near the boundary of the switching of the combination target images. Thus, there is a possibility that the continuity of an image deteriorates and an unnatural combined image is obtained.

Therefore, when generating a combined image with a wide dynamic range with respect to images including a moving object, it is important to generate an appropriate combined image while taking the moving object into consideration.

It is therefore desirable to generate an appropriate combined image considering the moving object when generating a combined image with a wide dynamic range with respect to images including the moving object.

According to an embodiment of the present invention, there is provided an image processing apparatus and an image processing method, and a program causing a computer to perform the image processing method, the image processing apparatus including: a conversion section that converts a moving object image which is an image in a region corresponding to a moving object included in a reference image and other images constituting a plurality of images generated under different exposure conditions so that the moving object image in the reference image corresponding to the moving object has the exposure levels of the other images so as to generate an exposure level converted moving object image for each of the other images; a substitution section that substitutes the generated exposure level converted moving object image with a region corresponding to an exposure level converted moving object image of each of the other images corresponding to an exposure level used as a reference exposure level at the time of generating the exposure level converted moving object image to generate a substitute image for each of the other images; and a combination section that combines the substitute image generated for each of the other images and the reference image to generate a combined image. With this configuration, the moving object image is converted so that the moving object image has the exposure level of the other images to generate the exposure level converted moving object image for each of the other images, the generated exposure level converted moving object image is substituted with the region corresponding to the exposure level converted moving object image of each of the other images corresponding to the exposure level used as a reference exposure level at the time of generating the exposure level converted moving object image to generate the substitute image for each of the other images, and the substitute image generated for each of the other images and the reference image are combined with each other to generate the combined image.

In the embodiment of the present invention, the image processing apparatus may further include a determination section that determines whether or not to generate the combined image based on an ISO sensitivity and an exposure difference of the plurality of images. With this configuration, whether or not the combined image is to be generated can be determined based on the ISO sensitivity and the exposure difference of the plurality of images.

In the embodiment of the present invention, when the ISO sensitivity of the plurality of images is lower than a predetermined reference value and the exposure difference of the plurality of images is smaller than a predetermined reference value, the determination section may determine that the combined image is to be generated. With this configuration, when the ISO sensitivity of the plurality of images is lower than a predetermined reference value and the exposure difference of the plurality of images is smaller than a predetermined reference value, it can be determined that the combined image is to be generated.

In the embodiment of the present invention, the image processing apparatus may further include a specific target object detection section that detects a specific target object included in the plurality of images; and a determination section that determines whether or not to generate the combined image based on the detection results by the specific target object detection section. With this configuration, it is possible to detect the specific target object included in the plurality of images, and whether or not the combined image is to be generated can be determined based on the detection results.

In the embodiment of the present invention, the specific target object detection section may detect the face of a person as the specific target object, and when the face of a person is detected from the plurality of images, the determination section may determine that the combined image is to be generated. With this configuration, when the face of the person is detected from the plurality of images, it can be determined that the combined image is to be generated.

In the embodiment of the present invention, the image processing apparatus may further include an imaging section that generates the plurality of images by continuously imaging the same target object several times with different exposure conditions. With this configuration, it is possible to generate a plurality of images by continuously imaging the same target object several times under different exposure conditions.

In the embodiment of the present invention, the image processing apparatus may further include a mode setting section that sets an imaging mode from among a plurality of imaging modes in accordance with a subject; and a determination section that determines whether or not to generate the combined image based on whether or not the set imaging mode is a specific imaging mode. With this configuration, the imaging mode can be set from among the plurality of imaging modes in accordance with the subject, and whether or not the combined image is to be generated can be determined based on whether or not the set imaging mode is the specific imaging mode.

In the embodiment of the present invention, the specific imaging mode may be an imaging mode aiming to image a moving object as a target subject in the subject, and when the set imaging mode is the specific imaging mode, the determination section may determine that the combined image is to be generated. With this configuration, when the set imaging mode is the specific imaging mode, it can be determined that the combined image is to be generated.

In the embodiment of the present invention, the image processing apparatus may further include an operation receiving section that receives an instruction operation for generating the combined image; and a determination section that determines whether or not to generate the combined image based on whether or not the instruction operation is received. With this configuration, whether or not the combined image is to be generated can be determined based on whether or not the instruction operation for combining the substitute image generated for each of the other images and the reference image to generate the combined image is received.

In the embodiment of the present invention, the conversion section may convert the reference image so that the reference image has the exposure level of the other images to generate an exposure level converted image related to the other images and extract an image in a region of the exposure level converted image corresponding to a moving object included in the generated exposure level converted image and the other images to generate the exposure level converted moving object image related to the other images. With this configuration, the reference image can be converted so that the reference image has the exposure level of the other images to generate an exposure level converted image related to the other images, the image in the region of the exposure level converted image corresponding to the moving object included in the generated exposure level converted image and the other images can be extracted to generate the exposure level converted moving object image related to the other images.

In the embodiment of the present invention, the image processing apparatus may further include a moving object detection section that detects a moving object included in the plurality of images by comparing the reference image and the other images; and a determination section that determines whether or not to generate the combined image based on the results of moving object detection by the moving object detection section. With this configuration, the moving object included in the plurality of images can be detected by comparing the reference image and the other images, and whether or not the combined image is to be generated can be determined based on the results of the moving object detection.

In the embodiment of the present invention, the determination section may determine that the combined image is to be generated when a moving object is detected from the plurality of images and determine that the combined image is not to be generated when a moving object is not detected from the plurality of images, and when it is determined that the combined image is not to be generated, the combination section may combine the plurality of images to generate a combined image. With this configuration, when the moving object is detected from the plurality of images, it can be determined that the combined image is to be generated by combining the substitute image generated for each of the other images and the reference image. When the moving object is not detected from the plurality of images, it can be determined that the combined image is not to be generated. When it is determined that the combined image is not to be generated, the plurality of images are combined with each other to generate a combined image.

In the embodiment of the present invention, the image processing apparatus may further include a combination map generation section that generates a combination map which represents a combination ratio for each pixel when generating the combined image based on the reference image, and the combination section may combine a substitute image generated for each of the other images and the reference image based on the generated combination map to generate the combined image. With this configuration, the combination map can be generated based on the reference image, and the combined image is generated based on the generated combination map.

According to the embodiments of the present invention, it is possible to obtain an excellent effect that an appropriate combined image taking a moving object into consideration can be generated when generating a combined image with a wide dynamic range with respect to images including the moving object.

BRIEF DESCRIPTION OF THE DRAWINGS

FIG. 1 is a block diagram showing a functional configuration example of an imaging apparatus according to a first embodiment of the present invention.

FIG. 2 is a diagram showing the relationship between an input luminance and a combination ratio used at the time of generating a combination map by a combination map generation section according to the first embodiment of the present invention.

FIGS. 4A to 4D are diagrams schematically showing the flow of an image combination process by the imaging apparatus according to the first embodiment of the present invention.

FIG. 5 is a diagram showing a determination criterion used for determining the necessity of moving object processing by a moving object processing determination section according to the first embodiment of the present invention.

FIG. 9 is a flowchart showing an example of the processing procedures of a combined image generation process by the imaging apparatus according to the first embodiment of the present invention.

FIG. 10 is a flowchart showing an example of the processing procedures of the combined image generation process by the imaging apparatus according to the first embodiment of the present invention.

FIG. 11 is a flowchart showing an example of the processing procedures of the combined image generation process by the imaging apparatus according to the first embodiment of the present invention.

FIG. 12 is a flowchart showing an example of the processing procedures of the combined image generation process by the imaging apparatus according to the first embodiment of the present invention.

DESCRIPTION OF THE PREFERRED EMBODIMENTS

Figure 3A:
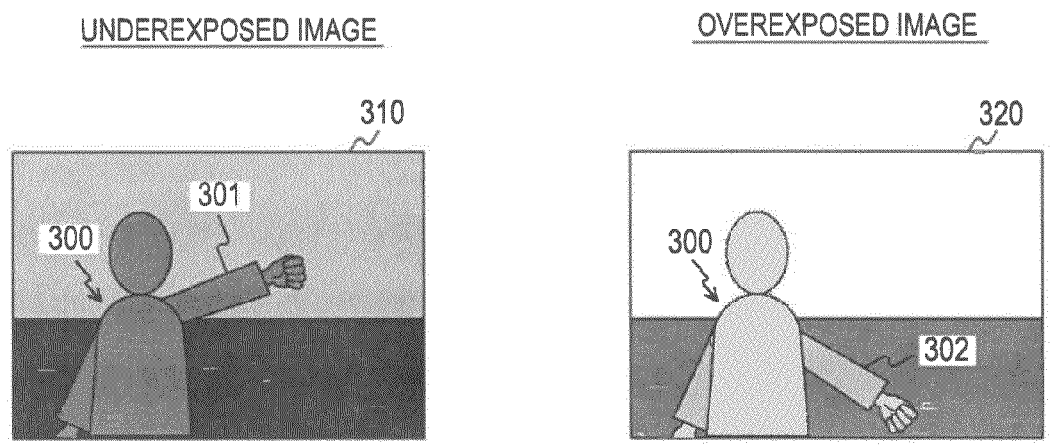
FIGS. 3A and 3B are diagrams schematically showing the flow of an image combination process by an image combination section according to the first embodiment of the present invention.

Hereinafter, modes for carrying out the present invention (hereinafter referred to as embodiments) will be described. The description will be given in the following order:

1. First Embodiment (Control of Combined Image Generation: Example of Generating Combined Image Considering Moving Object Region With Respect To Two Images Under different exposure conditions); And 2. Second Embodiment (Control of Combined Image Generation: Example of Generating Combined Image Considering Moving Object Region With Respect To Three Images Under different exposure conditions)

<1. First Embodiment>
[Configuration Example of Imaging Apparatus]

FIG. 1 is a block diagram showing a functional configuration example of an imaging apparatus 100 according to a first embodiment of the present invention. The imaging apparatus 100 includes an operation receiving section 110, a sensitivity setting section 121, an exposure difference setting section 122, an exposure mode setting section 123, and an imaging section 130. The imaging apparatus 100 further includes an image processing section 140, a face detection section 150, a moving object processing determination section 160, an image combination section 170, a recording control section 180, and an image storing section 190. The imaging apparatus 100 is implemented by a digital still camera, a digital video camera (for example, a camcorder), or the like which is capable of imaging a subject to generate image data and recording the image data on a recording medium as image content.

The operation receiving section 110 receives the content of operation inputs by a user and supplies operation signals corresponding to the content of the received operation inputs to each section. The operation receiving section 110 corresponds to an operation member, such as, for example, a shutter button, an operation button, an operation dial, and a touch panel.

The sensitivity setting section 121 performs setting of ISO sensitivity in accordance with a setting operation on ISO sensitivity (shooting ISO sensitivity) from the user received by the operation receiving section 110 and supplies the setting content to the imaging section 130 and the moving object processing determination section 160. The ISO sensitivity becomes high as the value thereof increases. Moreover, by setting the ISO sensitivity to a high value (high sensitivity), it is possible to photograph an image at a relatively fast shutter speed in a dark place. However, the resulting image has lots of noise.

The exposure difference setting section 122 performs setting of an exposure difference in accordance with a setting operation of exposure difference from the user received by the operation receiving section 110 and supplies the setting content to the imaging section 130, the image processing section 140, and the moving object processing determination section 160. The exposure difference means a difference in exposure between an underexposed image and an overexposed image. Here, the underexposed image and the overexposed image are the captured images generated continuously by the imaging section 130 under different exposure conditions. Specifically, an underexposed image is a captured image (a short exposure image) of which the exposure period is relatively short and is an image which values a bright portion of a subject in the same photographed scene. In contrast, an overexposed image is a captured image (a long exposure image) of which the exposure period is relatively long and is an image which values a dark portion of a subject in the same photographed scene. That is, an image region in which the gradation of a highlight is appropriately reproduced is included in the underexposed image, and an image region in which the gradation of a shadow is appropriately reproduced is included in the overexposed image. Therefore, by combining the underexposed image and the overexposed image, it is possible to generate a combined image in which the gradations of a highlight and a shadow are reproduced and widen a dynamic range. As a setting method of the exposure difference, a setting method of allowing a user to designate the exposure difference in the unit of an EV (Exposure Value) can be used. Moreover, a setting method of allowing the imaging section 130 to automatically calculate an appropriate exposure difference may be used.

The exposure mode setting section 123 performs setting of an exposure mode in accordance with a setting operation of an exposure mode from the user received by the operation receiving section 110 and supplies the setting content to the imaging section 130 and the moving object processing determination section 160. The exposure mode is an imaging mode for selecting an exposure control method. For example, a user is able to select the imaging mode from among an aperture preferential mode, a shutter speed preferential mode, a manual exposure mode, a program mode, and a scene mode in accordance with user preference. The aperture preferential mode is an exposure mode where an aperture value is set and an appropriate shutter speed is set in accordance with a luminance. The program mode is an exposure mode where an optimum control corresponding to a luminance is performed automatically. Moreover, the scene mode is a mode where control corresponding to a specific scene is performed, and for example, a portrait mode, a sports mode, a pet mode, a twilight mode, and a night scene mode can be set. The exposure mode setting section 123 is an example of a mode setting section as described in the claims.

The imaging section 130 generates a plurality of captured images (the underexposed images and overexposed images) under different exposure conditions based on the setting content of the sensitivity setting section 121, the exposure difference setting section 122, and the exposure mode setting section 123. That is, the imaging section 130 generates the underexposed images and overexposed images by continuously imaging the same subject twice under different exposure conditions based on the setting content of the exposure difference setting section 122. When an instruction operation (for example, a press operation on a shutter button) to record a still image is received by the operation receiving section 110, for example, the imaging section 130 generates one set of underexposed and overexposed images. In this case, the underexposed image and the overexposed image can be generated sequentially, for example. Moreover, when an instruction operation (for example, a press operation on a record button) to record a moving image is received by the operation receiving section 110, for example, the imaging section 130 generates underexposed images and overexposed images sequentially at a predetermined frame rate. In this case, the underexposed images and the overexposed images can be generated sequentially, for example. Moreover, the imaging section 130 supplies the generated captured images (the underexposed image and overexposed image) to the image processing section 140 and the face detection section 150.

Specifically, the imaging section 130 includes an imaging device that converts light of a subject incident through a lens into electrical signals and a signal processing section that processes the output signals of the imaging device to generate digital image signals (image data). That is, in the imaging section 130, an optical image of a subject incident through a lens is focused on an imaging surface of the imaging device, the imaging device performs an imaging operation in such a state, and the signal processing section performs signal processing on the imaged signals, whereby digital image signals are generated. The generated digital image signals are supplied to the image processing section 140 and the face detection section 150. As the imaging device, a CCD (Charge Coupled Device) and a CMOS (Complementary Metal Oxide Semiconductor) can be used, for example.

The image processing section 140 performs various kinds of image processing such as interpolation or color/gradation processing (for example, white balancing) with respect to the image signals (digital image signals) supplied from the imaging section 130. Moreover, the image processing section 140 performs an exposure level conversion process on a reference image in accordance with the exposure difference set by the exposure difference setting section 122 to generate an exposure level converted image. For example, the image processing section 140 performs a gain-up process (sensitization development) with respect to an underexposed image in accordance with the exposure difference set by the exposure difference setting section 122 to generate a gain-up image. Moreover, the image processing section 140 outputs image signals (captured images) having been subjected to various kinds of image processing to the image combination section 170.

The face detection section 150 detects the face of a person included in the captured image by analyzing the image signals (digital image signals) supplied from the imaging section 130 and outputs the detection results to the moving object processing determination section 160. As the results of the face detection, the face detection section 150 outputs face information including the presence of a face detection and the position and size of the face in the captured image, for example, to the moving object processing determination section 160. As a method of detecting a face included in an image, a face detection method (for example, see JP-A-2004-133637) based on matching between a detection target image and a template in which luminance distribution information of a face is recorded can be used. Moreover, a face detection method based on a characteristic amount of a flesh-colored portion or a person's face included in a detection target image can be used. By these face detection methods, it is possible to calculate the position and size of a person's face in the captured image. The face detection section 150 is an example of a target object detection section as described in the claims.

The moving object processing determination section 160 determines whether or not to perform moving object processing when performing an HDR (High Dynamic Range) combination process and outputs the determination results to the image combination section 170. Specifically, the moving object processing determination section 160 determines whether or not to perform the moving object processing based on the information from the operation receiving section 110, the sensitivity setting section 121, the exposure difference setting section 122, the exposure mode setting section 123, the face detection section 150, and the moving object region extraction section 172. For example, the moving object processing determination section 160 determines the necessity of the moving object processing based on whether or not the setting content of the sensitivity setting section 121 and the exposure difference setting section 122 are within the range of predetermined criteria (for example, a moving object processing preferential region 210 shown in FIG. 5). Moreover, the moving object processing determination section 160 determines the necessity of the moving object processing based on whether or not the face is detected by the face detection section 150, for example. Moreover, the moving object processing determination section 160 determines the necessity of the moving object processing based on the setting content of the exposure mode setting section 123, for example. Moreover, the moving object processing determination section 160 determines the necessity of the moving object processing based on the operation content received by the operation receiving section 110, for example. The determination as to the necessity of the moving object processing will be described in detail with reference to FIG. 5 and the like. The moving object processing determination section 160 is an example of a determination section as described in the claims.

The image combination section 170 generates an HDR combined image by performing an HDR combination process on the captured images (the underexposed and overexposed images) output from the image processing section 140 and outputs the generated HDR combined image to the recording control section 180. Specifically, the image combination section 170 includes a combination map generation section 171, a moving object region extraction section 172, a moving object region substitution section 173, and an HDR combination section 174.

The combination map generation section 171 generates a combination map for determining a combination ratio of respective pixels between the respective captured images with respect to the captured images (the underexposed and overexposed images) output from the image processing section 140. Specifically, the combination map generation section 171 generates the combination map based on a reference image (for example, an underexposed image) among the captured images output from the image processing section 140. Then, the combination map generation section 171 outputs the generated combination map to the HDR combination section 174. The generation method of the combination map will be described in detail with reference to FIG. 2.

The moving object region extraction section 172 analyzes the captured images output from the image processing section 140 to detect a moving object included in these images and extracts an image (a moving object image) corresponding to a region (a moving object region) included in the detected moving object from the exposure level converted image. For example, the moving object region extraction section 172 analyzes the captured images (the gain-up image and the overexposed image) output from the image processing section 140 to detect a moving object included in these images. Then, the moving object region extraction section 172 extracts a moving object image corresponding to a region (a moving object region) including the detected moving object from the exposure level converted image (the gain-up image). Moreover, the moving object region extraction section 172 outputs an image (an exposure level converted moving object image) included in the extracted moving object region to the moving object region substitution section 173. When a moving object is detected from the captured images output from the image processing section 140, the moving object region extraction section 172 outputs the detection results to the moving object processing determination section 160. The moving object detection method will be described in detail with reference to FIGS. 3A and 3B, FIGS. 4A to 4D, FIGS. 7A and 7B, and FIGS. 8A to 8D. The moving object region extraction section 172 is an example of a moving object detection section as described in the claims.

In this way, the image processing section 140 and the moving object region extraction section 172 convert a moving object image of a moving object included in the reference image and other images constituting a plurality of captured images so that the moving object image in the reference image corresponding to the moving object has the exposure levels of the other images. Moreover, the exposure level converted moving object image is generated for each of the other images. That is, the image processing section 140 and the moving object region extraction section 172 are an example of a conversion section as described in the claims.

The moving object region substitution section 173 substitutes the moving object image (the exposure level converted moving object image) output from the moving object region extraction section 172 with a moving object region of other different captured images (for example, an overexposed image) other than the reference image. Moreover, the moving object region substitution section 173 outputs the image (a moving object region substituted image) of which the moving object image is substituted to the HDR combination section 174. The moving object region substitution method will be described in detail with reference to FIGS. 4A to 4D. The moving object region substitution section 173 is an example of a substitution section as described in the claims.

The HDR combination section 174 performs an HDR combination process on the captured images (the underexposed and overexposed images) output from the image processing section 140 based on the combination map output from the combination map generation section 171. For example, the HDR combination section 174 combines the respective pixels of the reference image (for example, the underexposed image) output from the image processing section 140 and the moving object region substituted image output from the moving object region substitution section 173 in accordance with the combination map output from the combination map generation section 171. Then, the HDR combination section 174 generates the HDR combined image by combining the respective pixels of the reference image and the moving object region substituted image. Then, the HDR combination section 174 outputs the generated HDR combined image (a high dynamic range combined image) to the recording control section 180. The image combination method will be described in detail with reference to FIGS. 3A and 3B and FIGS. 4A to 4D. Moreover, the entire or part of the generated HDR combined image can be displayed on a display section (not shown) as a monitoring image during the recording of a moving image or during the standby state for recording of a still image. The HDR combination section 174 is an example of a combination section as described in the claims.

The recording control section 180 records the combined image output from the HDR combination section 174 in the image storing section 190 as image files (image content) in accordance with an operation input received by the operation receiving section 110. When an instruction operation to record a still image is received by the operation receiving section 110, for example, the recording control section 180 records the combined image output from the HDR combination section 174 in the image storing section 190 as still image files (still image content). During the recording, attribute information (for example, Exif (Exchangeable image file format) information) such as date information at the time of imaging is recorded in the image file. The instruction operation to record a still image is performed by a press operation on a shutter button, for example. Moreover, when an instruction operation to record a moving image is received by the operation receiving section 110, for example, the recording control section 180 records the combined image output at a predetermined frame rate from the HDR combination section 174 in the image storing section 190 as moving image files (moving image content). The instruction operation to record a moving image is performed by a press operation on a record button, for example.

The image storing section 190 stores the HDR combined image combined by the HDR combination section 174 as image files (image content) based on the control of the recording control section 180. As the image storing section 190, a removable recording medium (one or plural recording media) such as a disk (for example, a DVD (Digital Versatile Disc) or a semiconductor memory (for example, a memory card) can be used, for example. These recording media may be incorporated into the imaging apparatus 100 and may be removable from the imaging apparatus 100.

In this way, the imaging apparatus 100 performs a continuous shooting several times with a different exposure level and performs a combination process on a plurality of captured images generated by the shooting, thus generating an image of which the apparent dynamic range of a highlight to a shadow is widened.

In the first embodiment of the present invention, an example where an underexposed image is used as a reference image will be described.

[Generation Example of Combination Map]

FIG. 2 is a diagram showing the relationship between an input luminance and a combination ratio used at the time of generating a combination map by the combination map generation section 171 according to the first embodiment of the present invention. The combination ratio is a combination ratio of an underexposed image and an overexposed image (the sum of the combination ratios of the two images is 100%).

In the graph shown in FIG. 2, the horizontal axis represents the luminance (the input luminance) of the pixels constituting the underexposed image which is subjected to HDR combination, and the vertical axis represents the combination ratio used at the time of performing HDR combination on the underexposed image and the overexposed image (or the moving object region substituted image). The combination ratio corresponding to the input luminance can be determined by a straight line 200 in the graph.

For example, when the input luminance is relatively low (dark), the combination ratio of an underexposed image has a low value, and the combination ratio of an overexposed image has a high value. On the other hand, when the input luminance is high (bright), the combination ratio of an underexposed image has a high value, and the combination ratio of an overexposed image has a low value.

Here, a case where the combination map generation section 171 generates a combination map will be described. In this case, the combination map generation section 171 determines a combination ratio of the pixels constituting an underexposed image output from the image processing section 140 in accordance with the luminance of the pixels using the graph shown in FIG. 2. In this way, the combination map generation section 171 determines the combination ratio of the respective pixels constituting the underexposed image and generates a combination map with the determined combination ratios of the respective images.

The combination map generated as described above is used when performing HDR combination on the underexposed image and the overexposed image. That is, the respective images subjected to HDR combination are combined for each pixel using the combination ratio of each of the pixels constituting the respective images. The combination method will be described in detail with reference to FIGS. 3A and 3B and FIGS. 4A to 4D.

[Combination Example of Two Images Under Different Exposure Conditions]

Figure 3B:
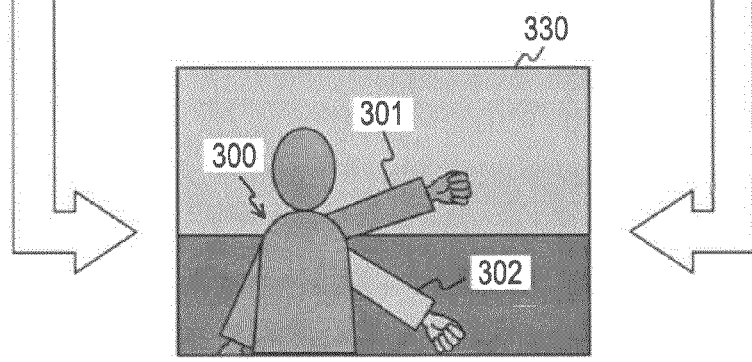

FIGS. 3A and 3B are diagrams schematically showing the flow of an image combination process by the image combination section 170 according to the first embodiment of the present invention. FIG. 3A shows the simplified views of an underexposed image 310 and an overexposed image 320 including a person 300 standing on the ground with the sky and the ground included as a structural outline. Here, the underexposed image 310 and the overexposed image 320 are images which are continuously captured under different exposure conditions by the imaging section 130. Moreover, these images are expected to be images captured in a state where the left arm (the left arm 301 of the underexposed image 310 and the left arm 302 of the overexposed image 320) of the person 300 is moving. Therefore, comparing the underexposed image 310 and the overexposed image 320 with each other, since the left arm of the person 300 is moving towards different positions in the respective images, the left arm is recognized as a moving object.

Specifically, in the underexposed image 310, although the gradation of the sky (a high luminance portion) is reproduced, the person 300 appears dark, and the gradation of a low luminance portion on the bottom (the ground region) of the underexposed image 310 is not reproduced. Moreover, the overexposed image 320 is an overexposed image, although the gradation of the sky is whited out and is not reproduced, the person 300 is appropriately exposed, and the gradation of a low luminance portion on the bottom portion (the ground region) of the overexposed image 320 is also reproduced.

Moreover, the combination map generation section 171 generates a combination map of the underexposed image 310 (a reference image). The combination map generation section 171 determines a combination ratio of the respective pixels constituting the underexposed image 310 based on the luminance of the respective pixels using the graph shown in FIG. 2 and generates the combination map of the underexposed image 310.

FIG. 3B shows the simplified view of an HDR combined image generated by performing HDR combination on the underexposed image 310 the overexposed image 320. Specifically, the HDR combination section 174 combines the underexposed image 310 and the overexposed image 320 output from the image processing section 140 in accordance with the combination map generated by the combination map generation section 171 to generate an HDR combined image 330. That is, the HDR combination section 174 performs a combination process on the underexposed image 310 and the overexposed image 320 on a pixel-by-pixel basis in accordance with the combination ratio for each of the pixels constituting the combination map generated by the combination map generation section 171 to generate the HDR combined image 330.

Here, as shown in FIG. 3B, when the combination process is performed on the underexposed image 310 and the overexposed image 320 each including a moving object in accordance with the combination map generated by the combination map generation section 171, the moving object is duplicated in the combined image. Specifically, since the left arm 301 included in the underexposed image 310 and the left arm 302 included in the overexposed image 320 are combined as the HDR combined image 330, a transition of the left arm of the person 300 is included in the HDR combined image 330. Therefore, there is a possibility that the generated HDR combined image 330 appears unnatural. Therefore, in the first embodiment of the present invention, with respect to images including a moving object, the HDR combination process is performed after moving object processing is performed considering the moving object region. A combination example will be described in detail with reference to FIGS. 4A to 4D.

[Combination Example of Images Considering Moving Object Region]

FIGS. 4A to 4D are diagrams schematically showing the flow of an image combination process by the imaging apparatus 100 according to the first embodiment of the present invention. FIG. 4A shows the simplified views of the underexposed image 310 and the overexposed image 320 including a person 300 standing on the ground with the sky and the ground included as a structural outline. In the underexposed image 310, a region of the left arm (the left arm 301 shown in FIG. 3A) of the person 300 before the movement is depicted as a moving object region 303, and a region of the left arm after the movement is depicted as a moving object region 304. Similarly, in the overexposed image 320, a region of the left arm (the left arm 302 shown in FIG. 3A) of the person 300 before the movement is depicted as a moving object region 305, and a region of the left arm after the movement is depicted as a moving object region 306. The contours of the moving object regions 303 to 306 are depicted by bold lines. Moreover, the underexposed image 310 and the overexposed image 320 are the same as the underexposed image 310 and the overexposed image 320 shown in FIG. 3A, except that the bold lines representing the moving object regions 303 to 306 are added.

FIG. 4B shows the simplified view of a gain-up image 311 generated by increasing the exposure level (gain) of the underexposed image 310. As shown in FIG. 4B, the image processing section 140 generates the gain-up image 311 by increasing the exposure level of the underexposed image 310 generated by the imaging section 130 by an amount corresponding to the exposure difference between the underexposed image 310 and the overexposed image 320. In this way, by performing gain-up processing on the underexposed image 310, it is possible to generate the gain-up image 311 of which the exposure level of the whole image has the same brightness level as the overexposed image 320. However, in the gain-up image 311, due to the gain-up processing, noise is noticeable when compared with the underexposed image 310 and the overexposed image 320. Moreover, in the gain-up image 311, the regions corresponding to the moving object regions 303 and 304 of the underexposed image 310 shown in FIG. 4A are denoted by the same reference numerals (the moving object regions 303 and 304).

FIG. 4C shows the simplified view of a moving object region substituted image 321 which is generated by substituting the images included in the moving object regions 303 and 304 of the gain-up image 311 with the moving object regions 305 and 306 of the overexposed image 320.

When generating the moving object region substituted image as described above, the moving object region extraction section 172 specifies the moving object region to be substituted. Specifically, the moving object region extraction section 172 detects a moving object (the left arms 301 and 302 of the person 300) included in the underexposed image 310 (the gain-up image 311) and the overexposed image 320.

Here, a moving object detection method will be described. For example, a detection method of detecting a moving object by comparing the gain-up image and the overexposed image having the same exposure level with each other can be used. Specifically, a detection method in which a difference value of the respective pixel values of each of the images is calculated for each pixel through comparison between the gain-up image 311 and the overexposed image 320, and a region of which the calculated difference value of the respective pixels is equal to or larger than a predetermined value is detected as a moving object region can be used. Moreover, other moving object detection methods may be used. The other moving object detection methods will be described in detail with reference to FIGS. 7A and 7B and FIGS. 8A to 8D. In addition, the moving object detection may be performed by a combination of the above-described moving object detection method and the other moving object detection methods.

Based on the detection results according to these detection methods, the moving object region extraction section 172 specifies the moving object regions (the regions including the detected moving object) 303 and 304 in the gain-up image 311. Subsequently, the moving object region extraction section 172 extracts images included in the specified moving object regions 303 and 304 from the gain-up image 311 and outputs the extracted images to the moving object region substitution section 173. Subsequently, the moving object region substitution section 173 substitutes (for example, completely substitutes) the images included in the moving object regions 303 and 304 extracted by the moving object region extraction section 172 with the moving object regions 305 and 306 of the overexposed image 320 to generate the moving object region substituted image 321. By performing substitution processing as described above, the moving objects in the underexposed image 310 and the overexposed image (the moving object region substituted image 321) which are subjected to the HDR combination process become approximately the same. Moreover, the moving object region substitution section 173 outputs the generated moving object region substituted image 321 to the HDR combination section 174.

In this way, moving object processing of substituting images included in the moving object region of the gain-up image with the moving object region of the overexposed image to generate the moving object region substituted image is performed. By performing the HDR combination process with respect to the moving object region substituted image generated through the moving object processing and the underexposed image, it is possible to prevent the moving object in the combined image from being duplicated.

FIG. 4D shows the simplified view of an HDR combined image 340 generated by performing HDR combination on the underexposed image 310 and the moving object region substituted image 321. Specifically, the HDR combination section 174 combines the underexposed image 310 from the image processing section 140 and the moving object region substituted image 321 from the moving object region substitution section 173 in accordance with the combination map generated by the combination map generation section 171 to generate the HDR combined image 340. That is, the HDR combination section 174 performs a combination process on the underexposed image 310 and the moving object region substituted image 321 on a pixel-by-pixel basis in accordance with the combination ratio for each of the pixels constituting the combination map generated by the combination map generation section 171 to generate the HDR combined image 340. The combination map used at the time of the combination is the same as the combination map used at the time of the combination of the HDR combined image 330 shown in FIG. 3B. Moreover, the moving object regions 307 and 308 corresponding to the left arms 301 and 302 of the person are included in the HDR combined image 340. Although an image corresponding to the left arm 301 of the person 300 is included in the moving object region 307, an image corresponding to the left arm 302 of the person 300 is not included in the moving object region 308.

In this way, by performing the combination process on the underexposed image 310 and the moving object region substituted image 321 each including the moving object in accordance with the combination map generated by the combination map generation section 171, it is possible to generate the HDR combined image 340 in which the moving object is not duplicated. Specifically, as shown in FIG. 4C, the images included in the moving object regions 303 and 304 of the gain-up image 311 are substituted with the moving object regions 305 and 306 of the overexposed image 320, whereby the moving object region substituted image 321 is generated. In the moving object region substituted image 321, only the image (the left arm 301 in the underexposed image 310 shown in FIG. 3A) included in the moving object region 303 of the gain-up image 311 is included as a moving object. Therefore, the moving objects in the underexposed image 310 and the overexposed image (the moving object region substituted image 321) become approximately the same, and the HDR combined image 340 which appears natural can be generated. Moreover, since the combination process is performed as described above, an image near the boundary of the moving object region and the image included in the moving object region can be reproduced as smooth images.

In this way, it is possible to generate the HDR combined image 340 with no duplication. However, since the images included in the moving object regions 303 and 304 of the moving object region substituted image 321 that is subjected to the HDR combination are extracted from the gain-up image 311, noise resulting from the gain-up processing is generated. That is, noise components are included in the moving object regions 307 and 308 of the HDR combined image 340. However, when the ISO sensitivity is low and the exposure difference is small, it is expected that these noise components are unnoticeable. Moreover, when the moving object is a subject that is barely noticeable, it is better to prioritize the moving object processing than the suppression of the noise. Therefore, in the following description, an example where whether or not the moving object processing is to be performed is switched based on the setting content of the imaging apparatus 100 will be described.

As a substitution method of the moving object image, a method of substituting a moving object image in an image (a gain-up image) obtained by increasing the gain of the underexposed image with a region (a moving object region) of the overexposed image corresponding to the moving object image can be used. In this substitution method, complete substitution is performed, for example. As another substitution method, a substitution method of changing a substitution ratio of the moving object image in the gain-up image in accordance with the difference value of the respective pixels of the overexposed image and the gain-up image can be used. In this substitution method, the moving object image in the gain-up image is substituted with the moving object region of the overexposed image in accordance with a combination ratio corresponding to the difference value of the respective pixels, for example. Moreover, other substitution methods may be used.

Moreover, as for an image combination method, an example where the HDR combined image is generated by performing a combination process in accordance with the combination map has been described. However, the image combination method is not limited to this method, and other image combination methods may be used.

Moreover, in this example, although the underexposed image is used as the reference image, the overexposed image may be used as the reference image. Moreover, the reference image may be designated in accordance with user operation.

[Determination Example of Necessity of Moving Object Processing Based on Exposure Difference and ISO Sensitivity]

FIG. 5 is a diagram showing a determination criterion used for determining the necessity of moving object processing by the moving object processing determination section 160 according to the first embodiment of the present invention. FIG. 5 shows an example of the relationship between the exposure difference and the ISO sensitivity when the exposure difference between the underexposed image and the overexposed image which are subjected to the HDR combination process and the ISO sensitivity are used as determination criteria. In the graph shown in FIG. 5, the horizontal axis represents the ISO sensitivity set by the sensitivity setting section 121, and the vertical axis represents the exposure difference set by the exposure difference setting section 122.

Here, when the moving object processing determination section 160 determines the necessity of the moving object processing, it is determined whether or not the setting content of the sensitivity setting section 121 and the exposure difference setting section 122 are included in a moving object processing preferential region 210 (a region specified by a dotted rectangle) shown in FIG. 5. When the setting content of the sensitivity setting section 121 and the exposure difference setting section 122 are included in the moving object processing preferential region 210, it is determined that the moving object processing determination section 160 performs the moving object processing. On the other hand, when the setting content of the sensitivity setting section 121 and the exposure difference setting section 122 are not included in the moving object processing preferential region 210, it is determined that the moving object processing determination section 160 does not perform the moving object processing. That is, when the setting content is included in a region (for example, a noiseless preferential region) other than the moving object processing preferential region 210, it is determined that the moving object processing is not performed. Moreover, the moving object processing determination section 160 outputs the determination results to the moving object region extraction section 172, the moving object region substitution section 173, and the HDR combination section 174.

For example, a region where the ISO sensitivity is within 1600 and the exposure difference is within 3 EV can be set as the moving object processing preferential region 210. That is, when a relatively low ISO sensitivity is set by the sensitivity setting section 121, and a relatively small exposure difference is set by the exposure difference setting section 122, it is determined that the moving object processing determination section 160 performs the moving object processing.

In this way, the moving object processing is performed only when a relatively low ISO sensitivity is set and a relatively small exposure difference is set, and the HDR combined image is generated using the moving object region substituted image generated by the moving object processing. In this way, when it is expected that the amount of noise included in the moving object region of the HDR combined image has increased to an annoying extent, the HDR combined image is generated without performing the moving object processing to prioritize noiseless processing. On the other hand, when it is expected that the amount of noise included in the moving object region of the HDR combined image is not present to an annoying extent, the HDR combined image is generated using the moving object region substituted image generated by the moving object processing to prioritize the prevention of duplication. In this way, it is possible to generate an appropriate HDR combined image in accordance with an increase/decrease of the amount of noise.

The moving object processing preferential region 210 shown in FIG. 5 is a simplified example in order to make it easily understood, and a region corresponding to other values may be set and used as the moving object processing preferential region. Moreover, these values may be set by user operation.

[Determination Example of Necessity of Moving Object Processing Based On Face Detection Results]

Next, an example where the necessity of the moving object processing is determined based on the face detection results by the face detection section 150 will be described. For example, when the face of a person is included in a captured image, it is expected that when a part of the body of the person moves, the probability of the part becoming a moving object is high. Therefore, when the face is detected by the face detection section 150, it is determined that the moving object processing determination section 160 performs the moving object processing. On the other hand, when the face is not detected by the face detection section 150, it is determined that the moving object processing determination section 160 does not perform the moving object processing. Moreover, the moving object processing determination section 160 outputs the determination results to the moving object region extraction section 172, the moving object region substitution section 173, and the HDR combination section 174.

In this way, by determining the necessity of the moving object processing based on the face detection results by the face detection section 150, it is possible to generate an HDR combined image considering the necessity of the moving object processing.

[Determination Example of Necessity of Moving Object Processing Based On Setting Content of Exposure Mode]

Next, an example where the necessity of the moving object processing is determined based on the setting content of the exposure mode setting section 123 will be described. For example, when an exposure mode (a specific imaging mode) wherein a moving object is usually a subject of interest is set, it is expected that the probability of a moving object being included in the captured image is high. This specific imaging mode can be a sports mode, a portrait mode, or a pet mode, for example. That is, when a specific imaging mode is set by the exposure mode setting section 123, it is determined that the moving object processing determination section 160 performs the moving object processing. On the other hand, when a specific imaging mode is not set by the exposure mode setting section 123, it is determined that the moving object processing determination section 160 does not perform the moving object processing. Moreover, the moving object processing determination section 160 outputs the determination results to the moving object region extraction section 172, the moving object region substitution section 173, and the HDR combination section 174.

In this way, by determining the necessity of the moving object processing based on the necessity of the exposure mode setting section 123 to set the specific imaging mode, it is possible to generate an HDR combined image considering the necessity of the moving object processing.

In addition, the moving object processing determination section 160 may determine the necessity of the moving object processing based on the necessity to set the specific imaging mode, the face detection results, and the determination results on the moving object processing based on the exposure difference and the ISO sensitivity. For example, it may be determined that the moving object processing is performed only when the setting content of the sensitivity setting section 121 and the exposure difference setting section 122 are included in the moving object processing preferential region 210 shown in FIG. 5, and the face is detected by the face detection section 150. Moreover, it may be determined that the moving object processing is performed only when the setting content of the sensitivity setting section 121 and the exposure difference setting section 122 are included in the moving object processing preferential region 210 shown in FIG. 5, and the specific imaging mode is set by the exposure mode setting section 123. Furthermore, the determination criteria may be changed by user operation so that these determination criteria can be changed in accordance with user preference.

[Determination Example of Necessity of Moving Object Processing Based on User Operation]

Next, an example where the necessity of the moving object processing is determined based on the operation content received by the operation receiving section 110 will be described. For example, it is expected that the moving object processing is prioritized by the user when an instruction operation (for example, a setting operation of a moving object processing HDR mode) to perform the moving object processing is received by the operation receiving section 110. Therefore, when such an instruction operation is received by the operation receiving section 110, it is determined that the moving object processing determination section 160 performs the moving object processing. On the other hand, when such an instruction operation is not received by the operation receiving section 110, it is determined that the moving object processing determination section 160 does not perform the moving object processing. Moreover, the moving object processing determination section 160 outputs the determination results to the moving object region extraction section 172, the moving object region substitution section 173, and the HDR combination section 174.

In this way, it is possible to determine the necessity of the moving object processing based on the presence of the instruction operation to perform the moving object processing. In this way, it is possible to generate an HDR combined image considering the necessity of the moving object processing by the user (whether the moving object processing or the noiseless processing will be prioritized).

The determination results on the necessity of the moving object processing by the moving object processing determination section 160 may be displayed on a display section (not shown) provided in the imaging apparatus 100. For example, when it is determined by the moving object processing determination section 160 to perform the moving object processing, an indicator representing the determination results (a moving object processing icon representing the determination results) may be displayed on the display section. For example, after an instruction operation to record a still image is received, and a recording process of a still image is completed, when the still image recorded by the recording process is automatically displayed for a predetermined period, the above-mentioned indicator may be displayed on the display section together with the still image. In this way, the user can easily grasp that the HDR combined image has been generated using the moving object region substituted image generated by the moving object processing.

[Example of Photographed Scene Requiring Moving Object Processing]

Figure 6A:
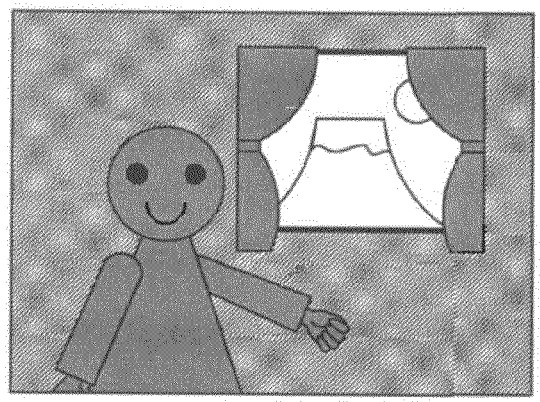
FIGS. 6A to 6C are diagrams showing the simplified views of photographed scenes obtained when captured images are generated using the imaging apparatus according to the first embodiment of the present invention.
Figure 6B:
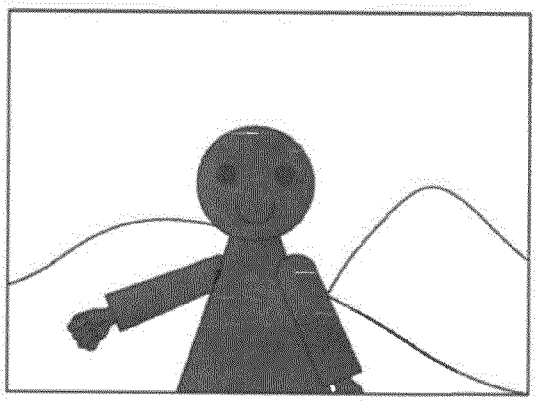
Figure 6C:
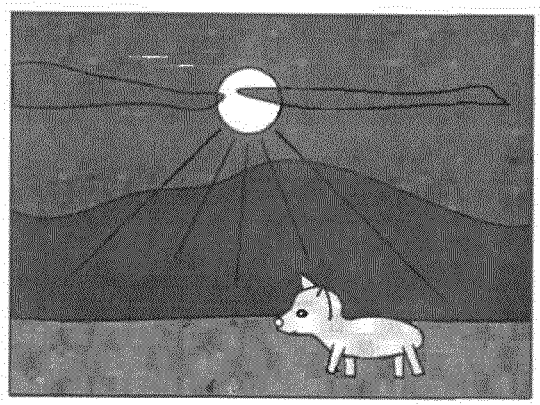

FIGS. 6A to 6C are diagrams showing the simplified views of photographed scenes obtained when captured images are generated using the imaging apparatus 100 according to the first embodiment of the present invention.

FIG. 6A shows an example of a photographed scene obtained when a person is inside (the person near a window) where an open window as the background is photographed as a subject. In the example scene shown in FIG. 6A, it is expected that the sunlight outside the window is strong and a region surrounded by the window is relatively bright, whereas the interior other than the region surrounded by the window is relatively dark. Moreover, it is expected that the left arm of the person near the window moves and is recognized as a moving object.

FIG. 6B shows an example of a photographed scene obtained when a person standing with a mountain as the background is photographed as a subject. In the example scene shown in FIG. 6B, since the person standing with the mountain as the background is in the backlit state, it is expected that the background is relatively bright, whereas a region corresponding to the person is relatively dark. Moreover, it is expected that the right arm of the person in the backlit state moves and is recognized as a moving object.

FIG. 6C shows an example of a photographed scene obtained when a mountain at twilight is photographed as a subject. In the example scene shown in FIG. 6C, since it is twilight, it is expected that a region near the sun is relatively bright, whereas other regions away from the sun are relatively dark. Moreover, it is expected that a dog present on the ground in front of the mountain moves and is recognized as a moving object.

Since these respective photographed scenes are scenes with a large difference in luminance, it is expected that the imaging device provided in the imaging apparatus 100 has an insufficient dynamic range. Therefore, as described above, it is possible to generate an HDR combined image with a wide dynamic range through the HDR combination process. Moreover, a moving object (the arm of the person shown in FIGS. 6A and 6B and the dog shown in FIG. 6C) is included in these respective photographed scenes. Therefore, by performing the above-described moving object processing on these respective photographed scenes, it is possible to prevent the moving object from being duplicated in a region (the moving object region) corresponding to the moving object. Moreover, since the HDR combination process is performed after the above-described moving object processing is performed, an image near the boundary of the moving object region and the image included in the moving object region can be reproduced as smooth images, and an appropriate HDR combined image considering the moving object can be generated.

[Modified Example of Moving Object Detection]

Figure 7A:
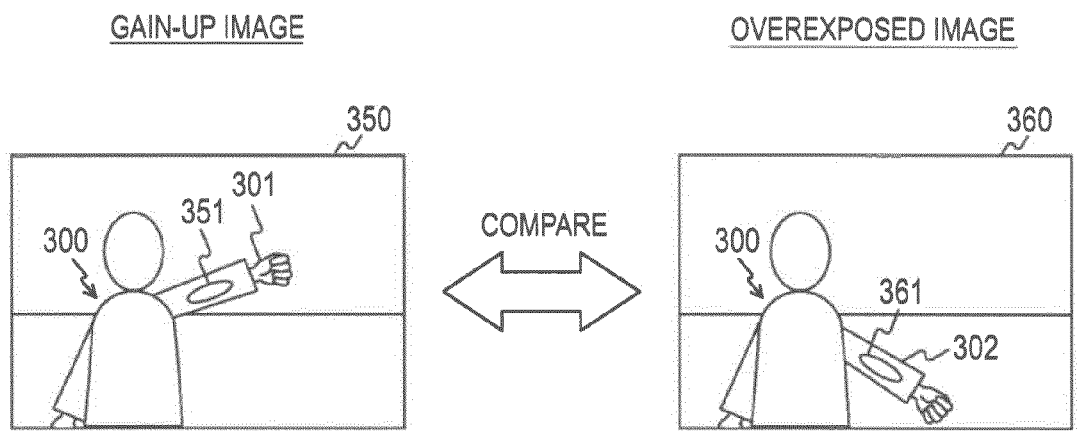
FIGS. 7A and 7B are diagrams schematically showing the flow of a moving object detection process by a moving object region extraction section according to the first embodiment of the present invention.
Figure 7B:
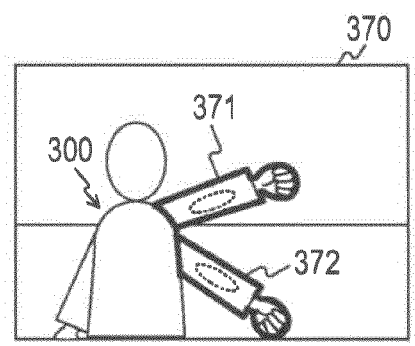
Figure 8A:
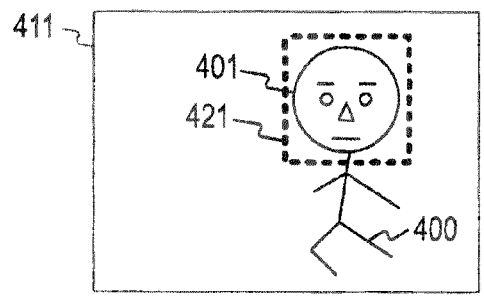
FIGS. 8A to 8D are diagrams schematically showing the flow of a moving object detection process by a face detection section according to the first embodiment of the present invention.
Figure 8B:
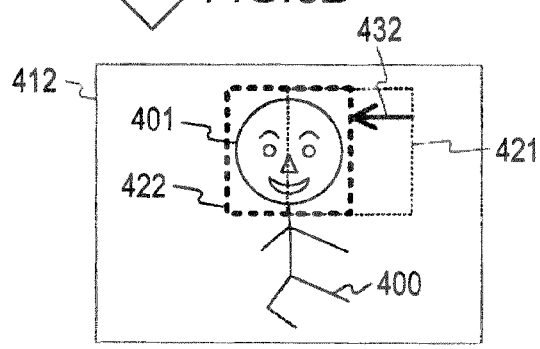
Figure 8C:
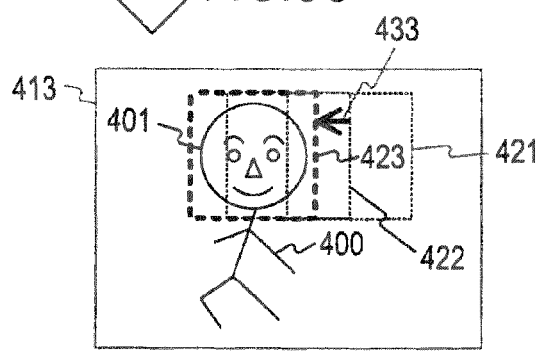
Figure 8D:
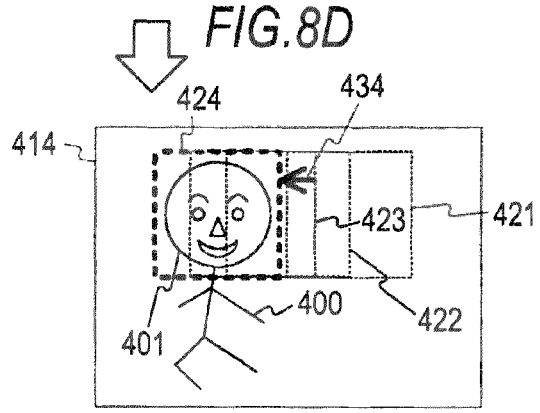

FIGS. 7A and 7B are diagrams schematically showing the flow of a moving object detection process by a moving object region extraction section 172 according to the first embodiment of the present invention. Since the example shown in FIGS. 7A and 7B is a modified example of the moving object detection process described above, some of the descriptions of the same portions are omitted.

FIG. 7A shows the simplified views of images 350 and 360 including a person 300 standing on the ground with the sky and the ground included as a structural outline. It is assumed that the image 350 corresponds to the gain-up image 311 shown in FIG. 4B, and the image 360 corresponds to the overexposed image 320 shown in FIG. 4A (FIG. 3A). Moreover, in the example shown in FIGS. 7A and 7B, the colors of the images are omitted in order to make it easily understandable.

Here, the moving object detection method will be described. As described above, a moving object can be detected by comparing a gain-up image and an overexposed image having the same exposure level with each other. Specifically, a difference value of the respective pixel values of each of the images is calculated for each pixel through comparison between the image (the gain-up image) 350 and the image (the overexposed image) 360, and a region of which the difference value of the respective pixels is equal to or larger than a predetermined value is detected as a moving object region. In this case, for example, it is expected that even when a region is included in a moving object region, if the difference value of the respective pixels constituting the region is less than a predetermined value, the region is not detected as the moving object region.

For example, it is assumed that the difference value of the respective pixels of a region 351 included in a region corresponding to the left arm 301 of the person 300 of the image (the gain-up image) 350 is less than a predetermined value. Moreover, it is assumed that the difference value of the respective pixels of a region 361 included in a region corresponding to the left arm 302 of the person 300 of the image (the overexposed image) 360 is less than a predetermined value. In this case, in the moving object detection process described above, the region 351 of the image 350 and the region 361 of the image 360 are not detected as the moving object region.

Therefore, in this example, when a region in which the difference value of the respective pixels is less than a predetermined value is present in a region in which the difference value of the respective pixels calculated through comparison between two images is equal to or larger than a predetermined value and satisfies a predetermined condition, this region is detected as a moving object region. For example, the predetermined condition may be a condition that the region in which the difference value is equal to or larger than the predetermined value is a closed region, and that the size of the region in which the difference value is less than the predetermined value is less than a predetermined size.

For example, it is assumed that the size of the region 351 of the image 350 shown in FIG. 7A and the size of the region 361 of the image 360 are less than a predetermined size. Moreover, a region (a region corresponding to the left arm 301) including the region 351 is a closed region, and a region (a region corresponding to the left arm 302) including the region 361 is a closed region. Therefore, the regions 351 and 361 are detected as the moving object region since they satisfy the predetermined condition described above.

FIG. 7B shows schematically the determination results of the moving object region by the moving object region extraction section 172. In FIG. 7B, as the detection results of the moving object region by the moving object region extraction section 172, the moving object regions detected through comparison between the images 350 and 360 are depicted as being surrounded by a bold contour (moving object regions 371 and 372) in an image 370. In the image 370, contours corresponding to the regions 351 and 361 shown in FIG. 7A are depicted by a dotted line.

In this way, even when a region in which the difference value of the respective pixels calculated through comparison between two images is not equal to or larger than a predetermined value satisfies a predetermined condition, the region can be detected as a moving object region. In this way, since the accuracy of the moving object detection can be improved, it is possible to generate an HDR combined image more appropriately.

[Moving Object Detection Example Using Face Detection Results]

In the above, an example where a moving object is detected by the moving object region extraction section 172 has been described. Here, when the face is included in a captured image, the face is detected by the face detection section 150. Moreover, even when the face is moving, the face after the movement is sequentially detected by the face detection section 150. Therefore, when the moving object is the face, it is possible to perform the moving object detection using the face detection results by the face detection section 150. In the following description, an example where the moving object detection is performed using the face detection results will be described.

FIGS. 8A to 8D are diagrams schematically showing the flow of a moving object detection process by the face detection section 150 according to the first embodiment of the present invention. It is assumed that images 411 to 414 shown in FIGS. 8A to 8D are captured images (reference images (for example, underexposed images)) which are continuously generated by the imaging section 130 and include a moving person 400. Moreover, in the images 411 to 414, it is assumed that the face 401 of the person 400 is sequentially detected by the face detection section 150. In order to make the description easily understood, the amount of movement of the person 400 is depicted to be relatively large in the images 411 to 414 shown in FIGS. 8A to 8D.

Here, a moving object detection method based on the face detection results will be described. As described above, when the face is detected by the face detection section 150, the face information (the position and size of the face) of the image that is subjected to the detection process is detected. Therefore, when the face is detected, the face detection section 150 holds the face information about the face. Moreover, when the face is detected from an image that is subjected to a subsequent face detection process, the face detection section 150 compares the face information related to the face and the maintained face information. Through the comparison, it is possible to determine whether or not the face region has moved.

For example, when the face 401 of the person 400 in the image 411 is detected by the face detection section 150, the face information (the position and size of the face 401 (depicted by a dotted rectangle 421 in FIG. 4A)) of the image 411 is detected. Therefore, the face detection section 150 holds the face information (the dotted rectangle 421) relating to the face 401. Subsequently, since the face 401 is detected from the image 412 which is subjected to a subsequent face detection process, the face detection section 150 compares the face information (depicted by a dotted rectangle 422 in FIG. 4B) relating to the face 401 and the maintained face information (the dotted rectangle 421) held therein with each other. Through the comparison, since it is determined that the face region is moving as shown by an arrow 432, the face detection section 150 determines the face 401 of the person 400 as a moving object. Moreover, the face detection section 150 outputs the determination results to the moving object processing determination section 160 and the moving object region extraction section 172 as moving object detection information (for example, the position and size of the face 401 before and after the movement (the dotted rectangles 421 and 422)). The moving object processing determination section 160 and the moving object region extraction section 172 are able to perform the respective kinds of processing described above using the moving object detection information. Moreover, similarly, the moving object detection process is performed on the images 413 and 414 by the face detection section 150. In this example, although an example where the face is detected as the moving object has been described, the moving object detection may be performed by sequentially detecting other objects (for example, a body part of a person) through an image recognition process. Moreover, for example, the moving object detection may be performed using a Lucas-Kanade method, a block matching method, and the like. The face detection section 150 is an example of a moving object detection section as described in the claims.

Moreover, the moving object region extraction section 172 compares the results of the moving object detection through the comparison between the gain-up image and the overexposed image and the results of the moving object detection from the face detection section 150, whereby the accuracy of the moving object detection can be improved.

[Operation Example of Imaging Apparatus]

FIG. 9 is a flowchart showing an example of the processing procedures of a combined image generation process by the imaging apparatus 100 according to the first embodiment of the present invention. In this example, the necessity of the moving object processing is determined based on whether or not the setting content of the ISO sensitivity and the exposure difference are within the range of predetermined criteria. Moreover, in this example, a generation example of a combined image when still images are recorded based on user operation will be described.

First, it is determined whether or not an instruction operation (for example, a press operation on a shutter button) to record a still image is received (step S901). When the instruction operation to record a still image is not received, monitoring is performed continuously. On the other hand, when the instruction operation to record a still image is received (step S901), a plurality of captured images (underexposed and overexposed images) under different exposure conditions is generated (step S902).

Subsequently, the image processing section 140 performs various kinds of image processing on the generated captured images (step S903). Subsequently, the image processing section 140 performs an exposure level conversion process on a reference image in accordance with the exposure difference set by the exposure difference setting section 122 to generate an exposure level converted image (step S904). For example, the image processing section 140 performs a gain-up process with respect to an underexposed image in accordance with the exposure difference set by the exposure difference setting section 122 to generate a gain-up image (step S904).

Subsequently, the combination map generation section 171 generates a combination map of the captured images (the underexposed and overexposed images) based on the reference image (step S905). Subsequently, the moving object region extraction section 172 analyzes the captured images (the gain-up image and the overexposed image) so as to determine whether or not a moving object is included in these images (step S906). When a moving object is included in the captured images (step S906), the moving object processing determination section 160 determines whether or not the setting content of the sensitivity setting section 121 and the exposure difference setting section 122 are within predetermined criteria (step S907). When the setting content is outside the range of predetermined criteria (step S907), the flow proceeds to step S911. On the other hand, when the setting content is within the range of predetermined criteria (step S907), the moving object region extraction section 172 extracts an image included in a region (a moving object region) including the detected moving object from the exposure level converted image (step S908). For example, the moving object region extraction section 172 extracts the moving object image from the gain-up image (step S908). The steps S904 and S908 are examples of a conversion step as described in the claims.

Subsequently, the moving object region substitution section 173 substitutes the moving object image with a moving object region in other captured images other than the reference image to generate a moving object region substituted image (step S909). For example, the moving object region substitution section 173 substitutes the moving object image with a moving object region in the overexposed image to generate the moving object region substituted image (step S909). Subsequently, the HDR combination section 174 performs an HDR combination process on the reference image (for example, the underexposed image) and the moving object region substituted image based on the combination map to generate an HDR combined image (step S910). The step S909 is an example of a substitution step as described in the claims. Moreover, the step S910 is an example of a combination step as described in the claims.

Moreover, when the moving object is not included in the captured images (step S906), the HDR combination section 174 performs an HDR combination process on the captured images (the underexposed and overexposed images) based on the combination map to generate the HDR combined image (step S911).

Subsequently, the recording control section 180 records the generated HDR combined image in the image storing section 190 as still image files (still image content) (step S912). In this example, although an example where the moving object detection is performed in step S906 through the analysis of the captured images (the gain-up image and the overexposed image) is described, the moving object detection may be performed by other moving object detection methods. In this case, for example, the exposure level conversion process in step S904 may be performed right before step S907 or right before step S908.

FIG. 10 is a flowchart showing an example of a processing procedure of the combined image generation process by the imaging apparatus 100 according to the first embodiment of the present invention. This processing procedure is a modified example of FIG. 9 and is different from that of FIG. 9, in that the necessity of the moving object processing is determined based on whether or not the face is detected from the captured images. Moreover, since the other points are the same as those of FIG. 9, the same portions as those of FIG. 9 will be denoted by the same reference numerals, and description thereof will be omitted.

When the moving object is included in the captured images (step S906), the moving object processing determination section 160 determines whether or not the face is detected from the captured images (step S921). When the face is not detected from the captured images (step S921), the flow proceeds to step S911. On the other hand, when the face is detected from the captured images (step S921), the flow proceeds to step S908.

FIG. 11 is a flowchart showing an example of a processing procedure of the combined image generation process by the imaging apparatus 100 according to the first embodiment of the present invention. This processing procedure is a modified example of FIG. 9 and is different from that of FIG. 9, in that the necessity of the moving object processing is determined based on whether or not a specific imaging mode is set as an exposure mode. Moreover, since the other things are the same as those of FIG. 9, the same portions as those of FIG. 9 will be denoted by the same reference numerals, and description thereof will be omitted.

When the moving object is included in the captured images (step S906), the moving object processing determination section 160 determines whether or not the specific imaging mode is set as the exposure mode (step S931). For example, the exposure mode setting section 123 determines whether or not the specific imaging mode (for example, a sports mode, a portrait mode, or a pet mode) is set. When the specific imaging mode is not set as the exposure mode (step S931), the flow proceeds to step S911. On the other hand, when the specific imaging mode is set as the exposure mode (step S931), the flow proceeds to step S908.

FIG. 12 is a flowchart showing an example of a processing procedure of the combined image generation process by the imaging apparatus 100 according to the first embodiment of the present invention. This processing procedure is a modified example of FIG. 9 and is different from that of FIG. 9, in that the necessity of the moving object processing is determined based on whether or not an imaging mode (for example, a moving object processing HDR mode) wherein the moving object processing is performed is set. Moreover, since the other points are the same as those of FIG. 9, the same portions as those of FIG. 9 will be denoted by the same reference numerals, and description thereof will be omitted.

When the moving object is included in the captured images (step S906), the moving object processing determination section 160 determines whether or not an imaging mode (for example, a moving object processing HDR mode) wherein the moving object processing is performed is set (step S941). For example, the operation receiving section 110 determines whether or not a setting operation of the moving object processing HDR mode is received. When the imaging mode wherein the moving object processing is performed is not set (step S941), the flow proceeds to step S911. On the other hand, when the imaging mode wherein the moving object processing is performed is set (step S941), the flow proceeds to step S908.

<2. Second Embodiment>

In the first embodiment of the present invention, an example where two captured images (the underexposed and overexposed images) are used as the captured images subjected to the HDR combination process has been described. Here, the HDR combination process described above can be similarly performed with respect to a case where three or more captured images under different exposure conditions are used as the captured images subjected to the HDR combination process. Therefore, in the second embodiment of the present invention, an example where the HDR combination process is performed using three or more captured images under different exposure conditions when generating an HDR combined image will be described. The functional configuration of the imaging apparatus according to the second embodiment of the present invention is approximately the same as the example configuration shown in FIG. 1. Therefore, the same portions as the first embodiment of the present invention will be denoted by the same reference numerals, and some of the descriptions will be omitted.

[Generation Example of Combination Map]

Figure 13:
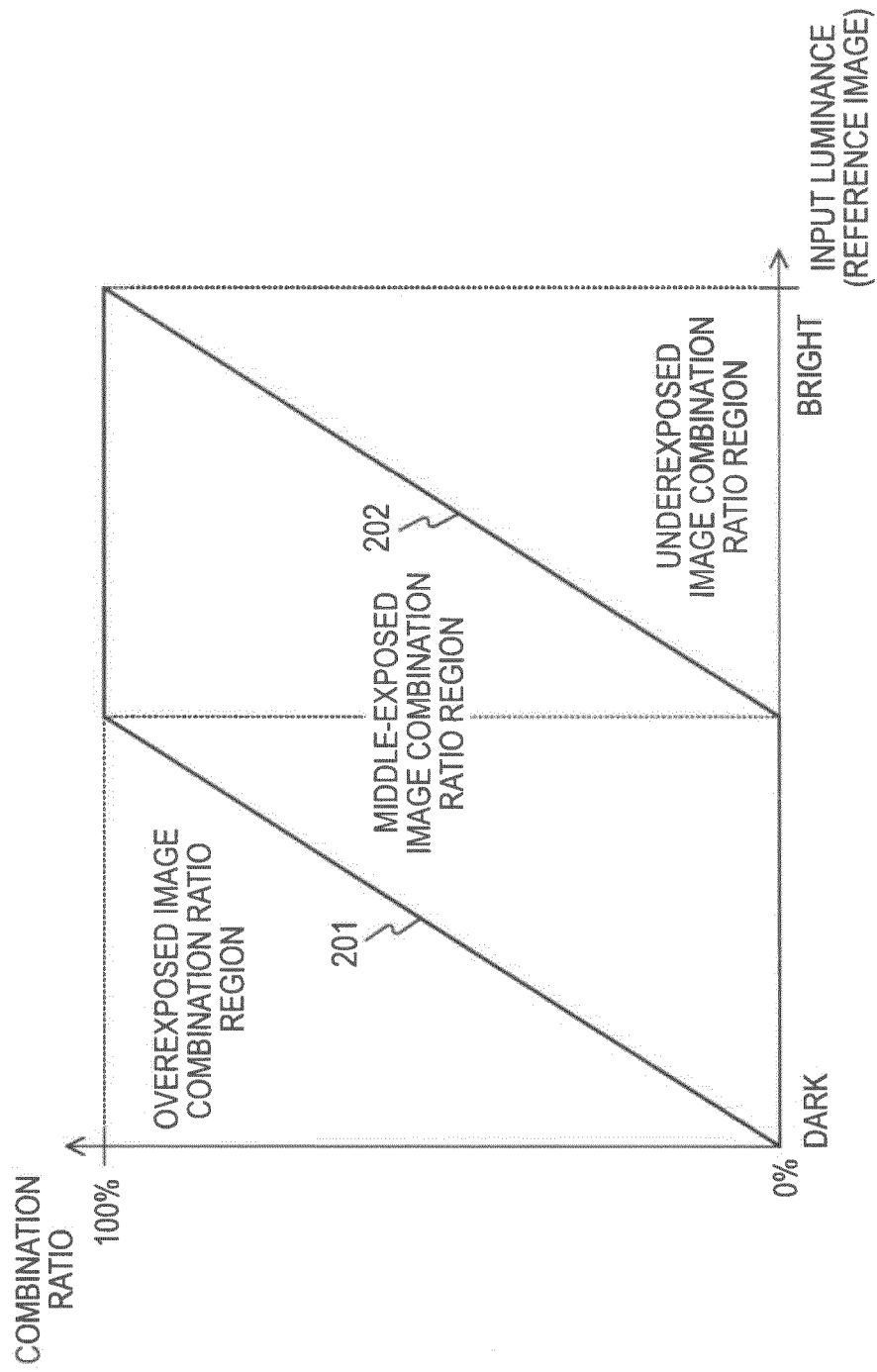
FIG. 13 is a diagram showing the relationship between an input luminance and a combination ratio used at the time of generating a combination map by a combination map generation section according to a second embodiment of the present invention.

FIG. 13 is a diagram showing the relationship between an input luminance and a combination ratio used at the time of generating a combination map by the combination map generation section 171 according to the second embodiment of the present invention. The combination ratio is a combination ratio of an underexposed image, a middle-exposed image, and an overexposed image (the sum of the combination ratios of the three images is 100%). Here, the underexposed image, the middle-exposed image, and the overexposed image are three images which are continuously generated under different exposure conditions. Moreover, in the example shown in FIG. 13, the underexposed image is used as the reference image.

Moreover, the graph shown in FIG. 13 is approximately the same as the graph shown in FIG. 2, except that straight lines 201 and 202 are shown instead of the straight line 200 shown in FIG. 2. Therefore, some of the descriptions of the same portions as those of the graph shown in FIG. 2 will be omitted.

In the graph shown in FIG. 13, the horizontal axis represents the luminance (the input luminance) of the pixels constituting the underexposed image which is subjected to HDR combination. Moreover, the vertical axis represents the combination ratio used at the time of performing HDR combination on the underexposed image, the middle-exposed image (or the moving object region substituted image), and the overexposed image (or the moving object region substituted image). The combination ratio corresponding to the input luminance can be determined by the straight lines 201 and 202 in the graph.

Here, a case where the combination map generation section 171 generates a combination map will be described. In this case, the combination map generation section 171 determines a combination ratio of the pixels constituting an underexposed image output from the image processing section 140 in accordance with the luminance of the pixels using the graph shown in FIG. 13. In this way, the combination map generation section 171 determines the combination ratio of the respective pixels constituting the underexposed image. The combination ratio is a combination ratio of the three images at the time of combining the underexposed image, the middle-exposed image, and the overexposed image. Then, the combination map generation section 171 generates a combination map with the determined combination ratios of the respective images.

The combination map generated as described above is used when performing HDR combination on the underexposed image, the middle-exposed image, and the overexposed image. That is, the respective images subjected to HDR combination are combined for each pixel using the combination ratio of each of the pixels constituting the respective images. The combination method will be described in detail with reference to FIG. 14.

[Combination Example of Three Images Under Different Exposure Conditions]

Figure 14:
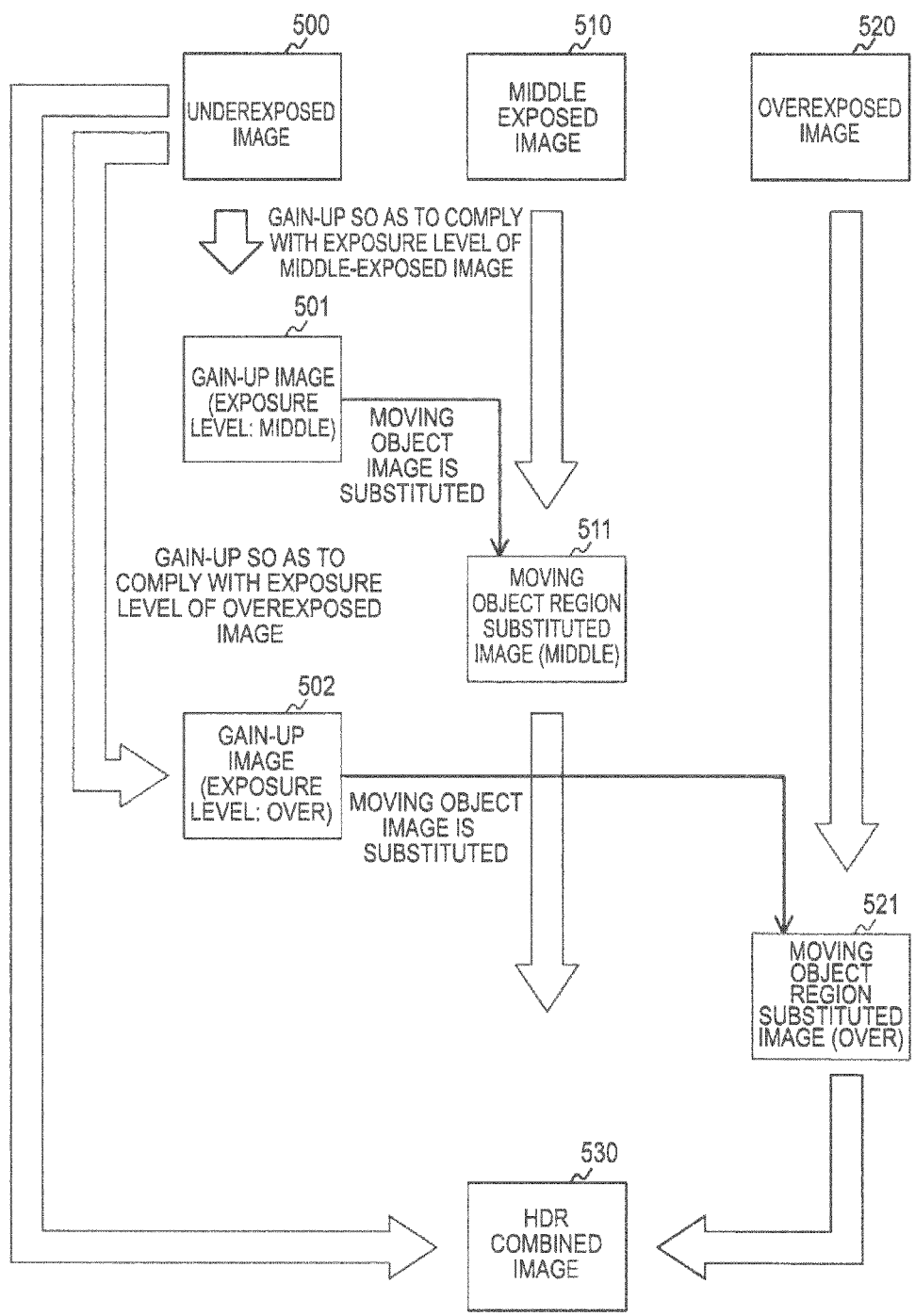
FIG. 14 is a diagram schematically showing the flow of an image combination process by an image combination section according to the second embodiment of the present invention.

FIG. 14 is a diagram schematically showing the flow of an image combination process by the image combination section 170 according to the second embodiment of the present invention. The example shown in FIG. 14 is a modified example of the image combination process shown in FIGS. 4A to 4D and is different from the image combination process shown in FIGS. 4A to 4D in that three images are subjected to the combination. Therefore, in the following description, some of the descriptions of the same portions as those of the image combination process shown in FIGS. 4A to 4D will be omitted.

An underexposed image 500, a middle-exposed image 510, and an overexposed image 520 shown in FIG. 14 are images which are continuously generated under different exposure conditions. Moreover, it is assumed that a moving object is included in the underexposed image 500, the middle-exposed image 510, and the overexposed image 520. The underexposed image 500 and the overexposed image 520 correspond to the underexposed image 310 and the overexposed image 320 shown in FIGS. 4A to 4D, respectively. Moreover, it is assumed that the middle-exposed image 510 is an image which is generated with an intermediate exposure level of those of the underexposed image 500 and the overexposed image 520. The respective images shown in FIG. 14 are schematically depicted as a rectangle in which characters representing the image are inserted. In the example shown in FIG. 14, the underexposed image 500 is used as the reference image.

First, a moving object region substituted image 511 is generated using the underexposed image 500 and the middle-exposed image 510. Specifically, a gain-up image 501 is generated by increasing the exposure level (gain-up) of the underexposed image 500 so as to comply with the middle-exposed image 510. That is, the image processing section 140 generates the gain-up image 501 by increasing the exposure level of the underexposed image 500 generated by the imaging section 130 by an amount corresponding to the exposure difference between the underexposed image 500 and the middle-exposed image 510. In this way, by performing gain-up processing on the underexposed image 500, it is possible to generate the gain-up image 501 of which the exposure level of the whole image has the same brightness level as the middle-exposed image 510.

Subsequently, the moving object region extraction section 172 detects a moving object included in the gain-up image 501 and the middle-exposed image 510 and specifies a moving object region (a region including the detected moving object) in the gain-up image 501. Subsequently, the moving object region extraction section 172 extracts an image included in the specified moving object region from the gain-up image 501 and outputs the extracted image to the moving object region substitution section 173. Subsequently, the moving object region substitution section 173 substitutes the image included in the moving object region extracted by the moving object region extraction section 172 with the moving object region (a region corresponding to the moving object region in which the image is extracted from the gain-up image 501) of the middle-exposed image 510 to generate the moving object region substituted image 511.

Subsequently, a moving object region substituted image 521 is generated using the underexposed image 500 and the overexposed image 520. Specifically, a gain-up image 502 is generated by increasing the exposure level (gain-up) of the underexposed image 500 so as to comply with the overexposed image 520. That is, the image processing section 140 generates the gain-up image 501 by increasing the exposure level of the underexposed image 500 generated by the imaging section 130 by an amount corresponding to the exposure difference between the underexposed image 500 and the overexposed image 520. In this way, by performing gain-up processing on the underexposed image 500, it is possible to generate the gain-up image 502 of which the exposure level of the whole image has the same brightness level as the overexposed image 520.

Subsequently, the moving object region extraction section 172 detects a moving object included in the gain-up image 502 and the overexposed image 520 and specifies a moving object region in the gain-up image 502. Subsequently, the moving object region extraction section 172 extracts an image included in the specified moving object region from the gain-up image 502 and outputs the extracted image to the moving object region substitution section 173. Subsequently, the moving object region substitution section 173 substitutes the image included in the moving object region extracted by the moving object region extraction section 172 with the moving object region of the overexposed image 520 to generate the moving object region substituted image 521.

By performing substitution processing as described above, the moving objects in the underexposed image 500, the moving object region substituted image (the middle-exposed image) 511, and the moving object region substituted image (the overexposed image) 521 which are subjected to the HDR combination process become approximately the same.

Subsequently, the HDR combination section 174 combines the underexposed image 500, the moving object region substituted image 511, and the moving object region substituted image 521 in accordance with the combination map generated by the combination map generation section 171 to generate an HDR combined image 530. In this example, although the moving object region substituted image 521 is generated after the moving object region substituted image 511 is generated, the order of generating these images may be changed. For example, the moving object region substituted images 511 and 521 may be generated at the same time, and the moving object region substituted image 511 may be generated after the moving object region substituted image 521 is generated.

In the above example, an image (the underexposed image) of which the exposure level is lowest is used as the reference image, the reference image is converted into an image so as to comply with an image of which the exposure level is high to generate a converted image, and the moving object image of the converted image is substituted to generate the moving object region substituted image. However, the moving object region substituted image may be generated using an image having a different exposure level as the reference image. Therefore, in the following description, an example where the moving object region substituted image is generated using the middle-exposed image as the reference image to generate the HDR combined image will be described.

Figure 15:
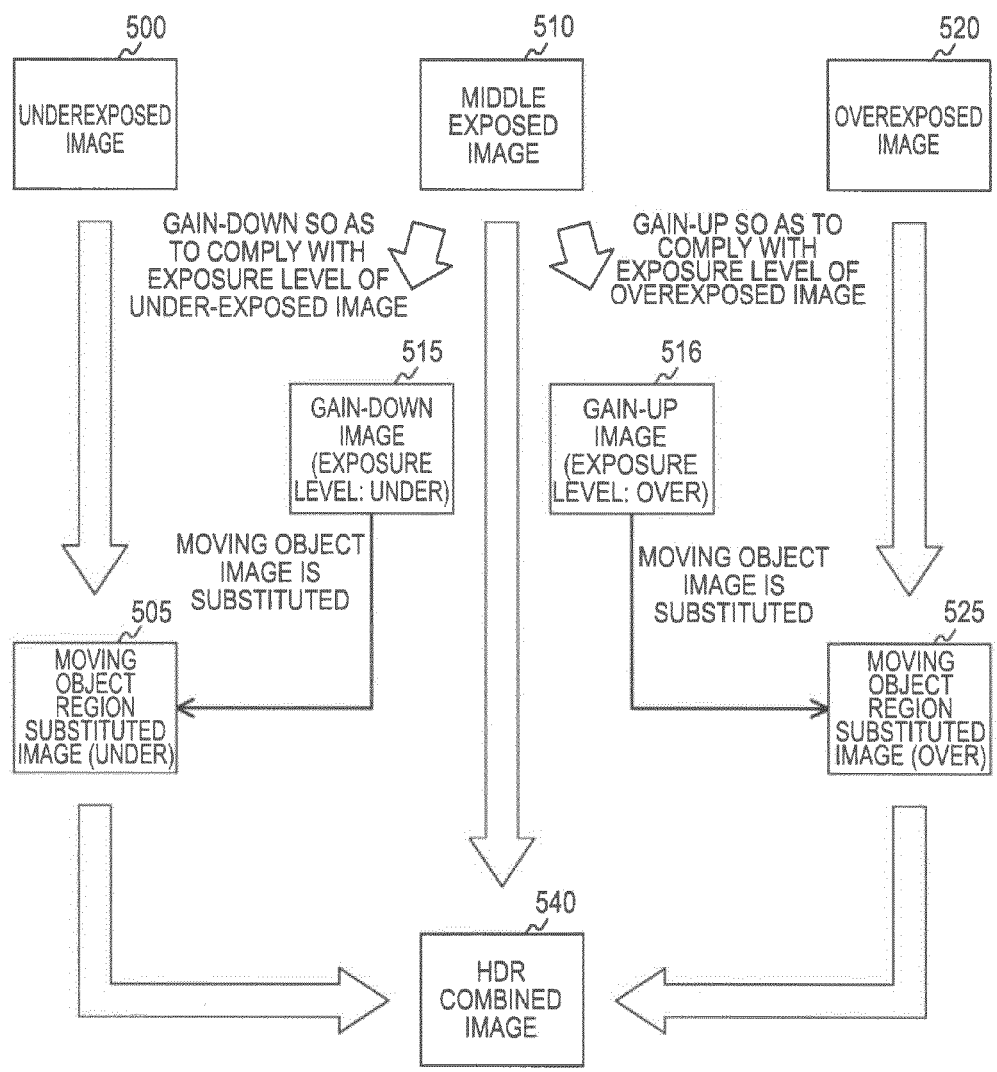
FIG. 15 is a diagram schematically showing the flow of an image combination process by the image combination section according to the second embodiment of the present invention.

FIG. 15 is a diagram schematically showing the flow of an image combination process by the image combination section 170 according to the second embodiment of the present invention. The example shown in FIG. 15 is a modified example of the image combination process shown in FIG. 14 and is different from the image combination process shown in FIG. 14 in that the middle-exposed image is used as the reference image. Therefore, in the following description, some of the descriptions of the same portions as those of the image combination process shown in FIG. 14 will be omitted.

The underexposed image 500, the middle-exposed image 510, and the overexposed image 520 shown in FIG. 15 are the same as the respective images shown in FIG. 14. Here, in the example shown in FIG. 15, since the middle-exposed image 510 is used as the reference image, the combination map generation section 171 determines a combination ratio of the pixels constituting the middle-exposed image 510 in accordance with the luminance of the pixels to generate a combination map. The illustration of the graph for generating the combination map will be omitted.

First, a moving object region substituted image 505 is generated using the underexposed image 500 and the middle-exposed image 510. Specifically, a gain-down image 515 is generated by decreasing the exposure level (gain-down) of the middle-exposed image 510 so as to comply with the underexposed image 500. That is, the image processing section 140 generates the gain-down image 515 by decreasing the exposure level of the middle-exposed image 510 generated by the imaging section 130 by an amount corresponding to the exposure difference between the underexposed image 500 and the middle-exposed image 510. In this way, by performing gain-down processing on the middle-exposed image 510, it is possible to generate the gain-down image 515 of which the exposure level of the whole image has the same brightness level as the underexposed image 500.

Subsequently, the moving object region extraction section 172 detects a moving object included in the gain-down image 515 and the underexposed image 500 and specifies a moving object region in the gain-down image 515. Subsequently, the moving object region extraction section 172 extracts an image included in the specified moving object region from the gain-down image 515 and outputs the extracted image to the moving object region substitution section 173. Subsequently, the moving object region substitution section 173 substitutes the image included in the moving object region extracted by the moving object region extraction section 172 with the moving object region of the underexposed image 500 to generate the moving object region substituted image 505.

Subsequently, a moving object region substituted image 525 is generated using the middle-exposed image 510 and the overexposed image 520. Specifically, a gain-up image 516 is generated by increasing the exposure level (gain-up) of the middle-exposed image 510 so as to comply with the overexposed image 520. That is, the image processing section 140 generates the gain-up image 516 by increasing the exposure level of the middle-exposed image 510 generated by the imaging section 130 by an amount corresponding to the exposure difference between the middle-exposed image 510 and the overexposed image 520. In this way, by performing gain-up processing on the middle-exposed image 510, it is possible to generate the gain-up image 516 of which the exposure level of the whole image has the same brightness level as the overexposed image 520.

Subsequently, the moving object region extraction section 172 detects a moving object included in the gain-up image 516 and the overexposed image 520 and specifies a moving object region in the gain-up image 516. Subsequently, the moving object region extraction section 172 extracts an image included in the specified moving object region from the gain-up image 516 and outputs the extracted image to the moving object region substitution section 173. Subsequently, the moving object region substitution section 173 substitutes the image included in the moving object region extracted by the moving object region extraction section 172 with the moving object region of the overexposed image 520 to generate the moving object region substituted image 525.

By performing substitution processing as described above, the moving objects in the moving object region substituted image (the underexposed image) 505, the middle-exposed image 510, and the moving object region substituted image (the overexposed image) 525 which are subjected to the HDR combination process become approximately the same.

Subsequently, the HDR combination section 174 combines the moving object region substituted image 505, the middle-exposed image 510, and the moving object region substituted image 525 in accordance with the combination map generated by the combination map generation section 171 to generate an HDR combined image 540. In this example, although the moving object region substituted image 525 is generated after the moving object region substituted image 505 is generated, the order of generating these images may be changed. For example, the moving object region substituted images 505 and 525 may be generated at the same time, and the moving object region substituted image 505 may be generated after the moving object region substituted image 525 is generated.

In the above example, although when three images are combined, the underexposed image or the middle-exposed image is used as the reference image, the overexposed image may be used as the reference image. Moreover, the imaging apparatus 100 may determine automatically an optimal reference image from among the three images in accordance with a photographed scene. For example, the optimal reference image can be determined through comparison of the bright portions or the dark portions of the three generated images (specifically, comparison of the occurrence states of whiteout or blackout). Moreover, the optimal reference image may be designated by user operation.

Moreover, in the embodiments of the present invention, although a case where two or three images are combined has been described, the embodiments of the present invention can be applied to a case where four or more images are combined. Moreover, at least one of the number of images to be combined and the reference image may be set by user operation.

Moreover, in the embodiments of the present invention, an example where the HDR combination process is performed at the time of imaging has been described. However, a plurality of captured images (for example, underexposed and overexposed images) under different exposure conditions may be recorded on a recording medium without performing the HDR combination process on the captured images, and the HDR combination process may be performed at the time of reproducing the captured images recorded on the recording medium. In this case, the HDR combination process may be performed in accordance with user operation, for example, and an image processing apparatus (for example, a reproduction apparatus) may perform the HDR combination process automatically. In this case, the HDR combination process can be performed based on the determination results of whether or not to perform the moving object processing described above.

Moreover, the embodiments of the present invention can be applied to an image processing apparatus such as a portable phone having the imaging capabilities, a personal computer, a video system, or an editing apparatus.

Moreover, in the embodiments of the present invention, although the face of a person is described as an example of an object of a specific target object to be detected, the embodiments of the present invention can be applied to other objects other than the face of the person. For example, a specific target object such as animals (for example, dogs, cats, horses, and cows) of various kinds such as mammals, reptiles, or fish; automobiles; or airplanes may be used as an object to be detected.

The embodiments of the present invention are shown as an example for implementing the present invention. As mentioned in the embodiments of the present invention, the matters in the embodiments of the present invention have corresponding relations to the invention specifying matters in the claims. Similarly, the invention specifying matters in the claims have corresponding relations to the matters in the embodiments of the present invention having the same names as the invention specifying matters. However, the present invention is not limited to the embodiments, and various modifications can be made in the range without departing from the subject matter of the present invention.

In addition, the processing procedures described in the embodiments of the present invention may be grasped as the methods including the series of procedures. Moreover, the series of procedures may be grasped as the programs for making a computer execute the series of the procedures, or a recording medium storing the programs. As the recording medium, a CD (compact disc), a MD (MiniDisc), a DVD (digital versatile disc), a memory card, a blu-ray disc (the registered trademark), and the like may be used.

The present application contains subject matter related to that disclosed in Japanese Priority Patent Application JP 2010-051861 filed in the Japan Patent Office on Mar. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a conversion section that converts a moving object image which is an image in a region corresponding to a moving object included in a reference image and other images constituting a plurality of images generated under different exposure conditions so that the moving object image in the reference image corresponding to the moving object has the exposure levels of the other images so as to generate an exposure level converted moving object image for each of the other images;
   a substitution section that substitutes, via a processor, the generated exposure level converted moving object image with a region corresponding to an exposure level converted moving object image of each of the other images corresponding to an exposure level used as a reference exposure level at the time of generating the exposure level converted moving object image to generate a substitute image for each of the other images;
   a combination section that combines the substitute image generated for each of the other images and the reference image to generate a combined image; and
   a determination section that determines whether or not to generate the combined image based on an ISO sensitivity and an exposure difference of the plurality of images, wherein when the ISO sensitivity of the plurality of images is lower than a predetermined reference value and the exposure difference of the plurality of images is smaller than a predetermined reference value, the determination section determines that the combined image is to be generated.

2. The image processing apparatus according to claim 1, further comprising:
   a specific target object detection section that detects a specific target object included in the plurality of images; and
   a determination section that determines whether or not to generate the combined image based on determination results by the specific target object detection section.

3. The image processing apparatus according to claim 2, wherein
   the specific target object detection section detects the face of a person as the specific target object, and
   in response to the face of a person being detected from the plurality of images, the determination section determines that the combined image is to be generated.

4. The image processing apparatus according to claim 1, further comprising:
   an imaging section that generates the plurality of images by continuously imaging the same target object several times under the different exposure conditions.

5. The image processing apparatus according to claim 4, further comprising:
   a mode setting section that sets an imaging mode from among a plurality of imaging modes in accordance with a subject; and
   a determination section that determines whether or not to generate the combined image based on whether or not the set imaging mode is a specific imaging mode.

6. The image processing apparatus according to claim 5, wherein
   the specific imaging mode is an imaging mode for imaging a moving object as a target subject in the subject, and
   in response to the set imaging mode being the specific imaging mode, the determination section determines that the combined image is to be generated.

7. The image processing apparatus according to claim 1, further comprising:
   an operation receiving section that receives an instruction operation for generating the combined image; and
   a determination section that determines whether or not to generate the combined image based on whether or not the instruction operation is received.

8. The image processing apparatus according to claim 1, wherein the conversion section converts the reference image so that the reference image has the exposure level of the other images to generate an exposure level converted image related to the other images and extracts an image in a region of the exposure level converted image corresponding to a moving object included in the exposure level converted image and the other images to generate the exposure level converted moving object image related to the other images.

9. The image processing apparatus according to claim 1, further comprising:

a moving object detection section that detects a moving object included in the plurality of images by comparing the reference image and the other images; and a determination section that determines whether or not to generate the combined image based on the results of moving object detection by the moving object detection section.

10. The image processing apparatus according to claim 9, wherein the determination section determines that the combined image is to be generated when a moving object is detected from the plurality of images and determines that the combined image is not to be generated when a moving object is not detected from the plurality of images, and in response to it being determined that the combined image is to be generated, the combination section combines the plurality of images to generate a combined image.

11. The image processing apparatus according to claim 1, further comprising;

a combination map generation section that generates a combination map which represents a combination ratio for each pixel when generating the combined image based on the reference image, wherein the combination section combines a substitute image generated for each of the other images and the reference image based on the generated combination map to generate the combined image.

12. An image processing method comprising the steps of:

converting a moving object image which is an image in a region corresponding to a moving object included in a reference image and other images constituting a plurality of images generated under different exposure conditions so that the moving object image in the reference image corresponding to the moving object has the exposure levels of the other images so as to generate an exposure level converted moving object image for each of the other images;

substituting, via a processor, the generated exposure level converted moving object image with a region corresponding to an exposure level converted moving object image of each of the other images corresponding to an exposure level used as a reference exposure level at the time of generating the exposure level converted moving object image to generate a substitute image for each of the other images;

combining the substitute image generated for each of the other images and the reference image to generate a combined image; and determining whether or not to generate the combined image based on an ISO sensitivity and an exposure difference of the plurality of images, wherein when the ISO sensitivity of the plurality of images is lower than a predetermined reference value and the exposure difference of the plurality of images is smaller than a predetermined reference value, it is determined that the combined image is to be generated.

13. A non-transitory computer-readable medium storing computer readable instructions thereon that when executed by a computer cause the computer to perform a method comprising:

converting a moving object image which is an image in a region corresponding to a moving object included in a reference image and other images constituting a plurality of images generated under different exposure conditions so that the moving object image in the reference image corresponding to the moving object has the exposure levels of the other images so as to generate an exposure level converted moving object image for each of the other images;

substituting the generated exposure level converted moving object image with a region corresponding to an exposure level converted moving object image of each of the other images corresponding to an exposure level used as a reference exposure level at the time of generating the exposure level converted moving object image to generate a substitute image for each of the other images;

combining the substitute image generated for each of the other images and the reference image to generate a combined image; and determining whether or not to generate the combined image based on an ISO sensitivity and an exposure difference of the plurality of images, wherein when the ISO sensitivity of the plurality of images is lower than a predetermined reference value and the exposure difference of the plurality of images is smaller than a predetermined reference value, it is determined that the combined image is to be generated.

* * * * *